(12) United States Patent
Filsfils et al.

(10) Patent No.: US 9,979,601 B2
(45) Date of Patent: May 22, 2018

(54) ENCODING EXPLICIT PATHS AS SEGMENT ROUTING SEGMENT LISTS

(71) Applicant: Cisco Technology, Inc., San Jose, CA (US)

(72) Inventors: Clarence Filsfils, Brussels (BE); Thomas F. Telkamp, Utrecht (NL); David D. Ward, Los Gatos, CA (US); Stewart F. Bryant, Redhill (GB)

(73) Assignee: Cisco Technology, Inc., San Jose, CA (US)

( * ) Notice: Subject to any disclaimer, the term of this patent is extended or adjusted under 35 U.S.C. 154(b) by 408 days.

(21) Appl. No.: 14/211,174

(22) Filed: Mar. 14, 2014

(65) Prior Publication Data

US 2014/0269422 A1    Sep. 18, 2014

Related U.S. Application Data

(60) Provisional application No. 61/791,242, filed on Mar. 15, 2013.

(51) Int. Cl.
*H04L 12/24* (2006.01)
*H04L 12/721* (2013.01)
(Continued)

(52) U.S. Cl.
CPC .............. *H04L 41/12* (2013.01); *H04L 45/04* (2013.01); *H04L 45/12* (2013.01); *H04L 45/46* (2013.01); *H04L 45/50* (2013.01); *H04L 45/507* (2013.01); *H04L 45/54* (2013.01); *H04L 45/74* (2013.01); *H04L 45/745* (2013.01); *H04L 49/608* (2013.01)

(58) Field of Classification Search
None
See application file for complete search history.

(56) References Cited

U.S. PATENT DOCUMENTS

| 5,764,624 A | 6/1998 | Endo .............................. 370/218 |
| 6,032,197 A | 2/2000 | Birtwell ........................ 709/216 |

(Continued)

FOREIGN PATENT DOCUMENTS

| CN | 1726 679 A | 1/2006 |
| CN | 101247 253 A | 8/2008 |

(Continued)

OTHER PUBLICATIONS

Vasseur, JP, et al.; Cisco Systems, Inc. "A Link-Type Sub-TLV to Convey the Number of Traffic Engineering Label Switched Paths Signaled with Zero Reserved Bandwidth Across a Link," Network Working Group, Request for Comments 5330; Oct. 2008, 16 pages.

(Continued)

*Primary Examiner* — Ayaz Sheikh
*Assistant Examiner* — Sori Aga
(74) *Attorney, Agent, or Firm* — Campbell Stephenson LLP

(57) ABSTRACT

A system and method are disclosed for generating segment routing (SR) segment lists. In one embodiment, a node receives information that identifies a path from a first node to a second node. Based on the received path, a set of segment identifiers that encodes the path is generated. A packet that is forwarded along the set of segment identifiers travels the received path.

18 Claims, 17 Drawing Sheets

(51) Int. Cl.
*H04L 12/723* (2013.01)
*H04L 12/715* (2013.01)
*H04L 12/741* (2013.01)
*H04L 12/931* (2013.01)

(56) References Cited

U.S. PATENT DOCUMENTS

| | | | |
|---|---|---|---|
| 6,374,303 B1 | 4/2002 | Armitage et al. | 709/242 |
| 6,577,600 B1 | 6/2003 | Bare | 370/238 |
| 6,647,428 B1 | 11/2003 | Bannai et al. | 709/245 |
| 6,963,570 B1 | 11/2005 | Agarwal | 370/310.2 |
| 7,023,846 B1 | 4/2006 | Andersson et al. | 370/389 |
| 7,031,253 B1 | 4/2006 | Katukam et al. | 370/222 |
| 7,031,607 B1 | 4/2006 | Aswood Smith | 398/51 |
| 7,061,921 B1 | 6/2006 | Sheth | 370/395.52 |
| 7,068,654 B1 | 6/2006 | Joseph et al. | 370/392 |
| 7,072,346 B2 | 7/2006 | Hama | 370/395.53 |
| 7,088,721 B1 | 8/2006 | Droz et al. | 370/395.1 |
| 7,154,416 B1 | 12/2006 | Savage | 341/51 |
| 7,174,387 B1 | 2/2007 | Shand et al. | 709/238 |
| 7,180,887 B1 | 2/2007 | Schwaderer | 370/351 |
| 7,260,097 B2 | 8/2007 | Casey | 370/392 |
| 7,286,479 B2 | 10/2007 | Bragg | 370/225 |
| 7,330,440 B1 | 2/2008 | Bryant | 370/254 |
| 7,359,377 B1 | 4/2008 | Kompella et al. | 370/389 |
| 7,373,401 B1 | 5/2008 | Azad | 370/236.2 |
| 7,420,992 B1 | 9/2008 | Fang | 370/477 |
| 7,430,210 B2 | 9/2008 | Havala et al. | 370/395.53 |
| 7,463,639 B1 | 12/2008 | Rekhter | 370/409 |
| 7,466,661 B1 | 12/2008 | Previdi et al. | 370/254 |
| 7,471,669 B1 | 12/2008 | Sabesan et al. | 370/351 |
| 7,564,803 B1 | 7/2009 | Minei et al. | 370/254 |
| 7,577,143 B1 | 8/2009 | Kompella | 370/392 |
| 7,602,778 B2 | 10/2009 | Guichard et al. | 370/389 |
| 7,610,330 B1 | 10/2009 | Quinn | 709/201 |
| 7,773,630 B2 | 8/2010 | Huang et al. | 370/474 |
| 7,817,667 B2 | 10/2010 | Frederiksen et al. | 370/474 |
| 7,885,259 B2 | 2/2011 | Filsfils | 370/389 |
| 7,885,294 B2 | 2/2011 | Patel | 370/202 |
| 7,894,352 B2 | 2/2011 | Kompella | 370/248 |
| 7,894,458 B2 | 2/2011 | Jiang | 370/401 |
| 7,940,695 B1 | 5/2011 | Bahadur | 370/254 |
| 7,983,174 B1 | 7/2011 | Monaghan | 370/242 |
| 8,064,441 B2 | 11/2011 | Wijnands et al. | 370/389 |
| 8,339,973 B1 | 12/2012 | Pichumani | 370/248 |
| 8,422,514 B1 | 4/2013 | Kothari et al. | 370/466 |
| 8,542,706 B2 | 9/2013 | Wang et al. | 370/474 |
| 8,611,335 B1 | 12/2013 | Wu | 370/351 |
| 8,619,817 B1 | 12/2013 | Everson | 370/474 |
| 8,630,167 B2 | 1/2014 | Ashwood Smith | 370/255 |
| 8,711,883 B2 | 4/2014 | Kang | 370/389 |
| 8,792,384 B2 | 7/2014 | Banerjee et al. | 370/254 |
| 8,953,590 B1 | 2/2015 | Aggarwal | 370/389 |
| 9,036,474 B2 | 5/2015 | Dibirdi et al. | 370/235 |
| 9,112,734 B2 | 8/2015 | Edwards et al. | |
| 9,118,572 B2 | 8/2015 | Sajassi | |
| 9,319,312 B2 | 4/2016 | Filsfils et al. | 709/223 |
| 9,571,349 B2 | 2/2017 | Previdi et al. | |
| 9,660,897 B1 | 5/2017 | Gredler | |
| 2001/0037401 A1 | 11/2001 | Soumiya | 709/232 |
| 2002/0103732 A1 | 8/2002 | Bundy et al. | 705/35 |
| 2003/0016678 A1 | 1/2003 | Maeno | 370/400 |
| 2003/0026271 A1 | 2/2003 | Erb et al. | 370/401 |
| 2003/0126272 A1 | 7/2003 | Corl et al. | 709/230 |
| 2003/0133412 A1 | 7/2003 | Iyer | 370/235 |
| 2003/0142674 A1 | 7/2003 | Casey | 370/393 |
| 2003/0142685 A1 | 7/2003 | Bare | 370/410 |
| 2003/0231634 A1 | 12/2003 | Henderson | 370/395.32 |
| 2004/0160958 A1 | 8/2004 | Oh | 370/395.1 |
| 2004/0174879 A1 | 9/2004 | Basso et al. | 370/392 |
| 2004/0196840 A1 | 10/2004 | Amrutur et al. | 370/389 |
| 2004/0202158 A1 | 10/2004 | Takeno | 379/389 |
| 2004/0240442 A1 | 12/2004 | Grimminger | 379/389 |
| 2005/0073958 A1* | 4/2005 | Atlas | H04L 45/00 370/238 |
| 2005/0213513 A1 | 9/2005 | Ngo | 370/254 |
| 2005/0259655 A1 | 11/2005 | Cuervo et al. | 370/392 |
| 2006/0002304 A1 | 1/2006 | Ashwood-Smith | 370/238 |
| 2006/0013209 A1 | 1/2006 | Somasundaram | 370/389 |
| 2006/0056397 A1 | 3/2006 | Aizu | 370/352 |
| 2006/0075134 A1 | 4/2006 | Aalto | 709/238 |
| 2006/0080421 A1 | 4/2006 | Hu | 709/223 |
| 2006/0092940 A1 | 5/2006 | Ansari | 370/392 |
| 2006/0146696 A1 | 7/2006 | Li | 370/218 |
| 2006/0187817 A1 | 8/2006 | Charzinski | 370/216 |
| 2006/0262735 A1 | 11/2006 | Guichard | 370/254 |
| 2006/0274716 A1 | 12/2006 | Oswal et al. | 370/349 |
| 2007/0019647 A1 | 1/2007 | Roy et al. | 370/392 |
| 2007/0053342 A1 | 3/2007 | Slerekl | 370/351 |
| 2007/0058638 A1 | 3/2007 | Guichard et al. | 370/395.31 |
| 2007/0189291 A1 | 8/2007 | Tian | 370/390 |
| 2007/0245034 A1 | 10/2007 | Retana | 709/238 |
| 2008/0002699 A1 | 1/2008 | Rajsic | 370/392 |
| 2008/0075016 A1 | 3/2008 | Ashwood-Smith | 370/252 |
| 2008/0075117 A1 | 3/2008 | Tanaka | 370/471 |
| 2008/0084881 A1 | 4/2008 | Dharwadkar et al. | 370/392 |
| 2008/0101227 A1 | 5/2008 | Fujita | 370/232 |
| 2008/0101239 A1 | 5/2008 | Good | 370/235 |
| 2008/0172497 A1 | 7/2008 | Mohan et al. | 709/249 |
| 2008/0189393 A1 | 8/2008 | Wagner | 709/218 |
| 2008/0192762 A1 | 8/2008 | Kompella et al. | 370/395.53 |
| 2008/0212465 A1 | 9/2008 | Yan | 370/225 |
| 2008/0225864 A1 | 9/2008 | Aissaoui et al. | 370/401 |
| 2008/0253367 A1 | 10/2008 | Ould-Brahim | 370/389 |
| 2008/0259820 A1 | 10/2008 | White et al. | 370/255 |
| 2009/0041038 A1 | 2/2009 | Martini et al. | 370/401 |
| 2009/0049194 A1 | 2/2009 | Csaszar | 709/242 |
| 2009/0067445 A1 | 3/2009 | Diguet | 370/419 |
| 2009/0080431 A1 | 3/2009 | Rekhter | 370/392 |
| 2009/0135815 A1 | 5/2009 | Pacella | 370/389 |
| 2009/0296710 A1 | 12/2009 | Agrawal | 370/392 |
| 2010/0063983 A1 | 3/2010 | Groarke et al. | 707/803 |
| 2010/0088717 A1 | 4/2010 | Candelore et al. | 725/32 |
| 2010/0124231 A1 | 5/2010 | Kompella | 370/40 |
| 2010/0142548 A1 | 6/2010 | Sheth | 370/410 |
| 2010/0220739 A1 | 9/2010 | Ishiguro | 370/401 |
| 2010/0232435 A1 | 9/2010 | Jabr | 370/392 |
| 2010/0272110 A1* | 10/2010 | Allan | H04L 45/02 370/395.53 |
| 2010/0284309 A1 | 11/2010 | Allan et al. | 370/256 |
| 2011/0060844 A1* | 3/2011 | Allan | H04L 45/00 709/241 |
| 2011/0063986 A1 | 3/2011 | Denecheau | 370/248 |
| 2011/0090913 A1 | 4/2011 | Kim | 370/400 |
| 2011/0228780 A1 | 9/2011 | Ashwood-Smith | 370/392 |
| 2011/0261722 A1* | 10/2011 | Awano | H04L 45/34 370/254 |
| 2011/0268114 A1 | 11/2011 | Wijnands et al. | 370/389 |
| 2011/0280123 A1 | 11/2011 | Wijnands et al. | 370/228 |
| 2011/0286452 A1 | 11/2011 | Balus | 370/390 |
| 2012/0044944 A1 | 2/2012 | Kotha et al. | 370/401 |
| 2012/0063526 A1 | 3/2012 | Xiao | 375/259 |
| 2012/0069740 A1 | 3/2012 | Lu et al. | 370/238 |
| 2012/0069845 A1 | 3/2012 | Carney et al. | 370/392 |
| 2012/0075988 A1 | 3/2012 | Lu | 370/218 |
| 2012/0082034 A1 | 4/2012 | Vasseur | 370/235 |
| 2012/0120808 A1 | 5/2012 | Nandagopal et al. | 370/238 |
| 2012/0170461 A1 | 7/2012 | Long | 370/235 |
| 2012/0213225 A1 | 8/2012 | Subramanian et al. | 370/392 |
| 2012/0218884 A1 | 8/2012 | Kini | 370/228 |
| 2012/0236860 A1 | 9/2012 | Kompella et al. | 370/392 |
| 2012/0307629 A1 | 12/2012 | Vasseur | 370/228 |
| 2013/0003728 A1 | 1/2013 | Kwong et al. | 370/389 |
| 2013/0051237 A1 | 2/2013 | Ong | 370/237 |
| 2013/0077476 A1 | 3/2013 | Enyedi | 370/225 |
| 2013/0077626 A1 | 3/2013 | Keesara et al. | 370/390 |
| 2013/0142052 A1 | 6/2013 | Burbidge | 370/242 |
| 2013/0188634 A1 | 7/2013 | Magee | 370/389 |
| 2013/0219034 A1 | 8/2013 | Wang | 709/222 |
| 2013/0258842 A1 | 10/2013 | Mizutani | 370/228 |
| 2013/0266012 A1 | 10/2013 | Dutta et al. | 370/392 |
| 2013/0266013 A1 | 10/2013 | Dutta et al. | 370/392 |
| 2013/0343204 A1 | 12/2013 | Geib et al. | 370/248 |
| 2014/0098675 A1 | 4/2014 | Frost et al. | 370/241.1 |

(56) References Cited

U.S. PATENT DOCUMENTS

| | | | |
|---|---|---|---|
| 2014/0160925 A1 | 6/2014 | Xu | 370/235 |
| 2014/0169370 A1 | 6/2014 | Filsfils et al. | 370/392 |
| 2014/0177638 A1 | 6/2014 | Bragg et al. | 370/395.3 |
| 2014/0189156 A1 | 7/2014 | Morris | 709/238 |
| 2014/0254596 A1 | 9/2014 | Filsfils et al. | 370/392 |
| 2014/0269266 A1 | 9/2014 | Filsfils et al. | 370/228 |
| 2014/0269421 A1 | 9/2014 | Previdi et al. | 370/254 |
| 2014/0269698 A1 | 9/2014 | Filsfils et al. | 370/389 |
| 2014/0269699 A1 | 9/2014 | Filsfils et al. | 370/389 |
| 2014/0269721 A1 | 9/2014 | Bashandy | 370/392 |
| 2014/0269725 A1 | 9/2014 | Filsfils et al. | 370/392 |
| 2014/0269727 A1 | 9/2014 | Filsfils et al. | 370/392 |
| 2014/0286195 A1 | 9/2014 | Fedyk | 370/254 |
| 2014/0317259 A1 | 10/2014 | Previdi et al. | 709/223 |
| 2014/0369356 A1 | 12/2014 | Bryant et al. | 370/392 |
| 2015/0023328 A1 | 1/2015 | Thubert et al. | 370/336 |
| 2015/0030020 A1 | 1/2015 | Kini | 370/389 |
| 2015/0256456 A1 | 9/2015 | Previdi et al. | 370/392 |
| 2015/0263940 A1 | 9/2015 | Kini | 370/236.2 |
| 2015/0326675 A1 | 11/2015 | Kini | 709/224 |
| 2015/0381406 A1 | 12/2015 | Francois | 370/218 |
| 2016/0006614 A1 | 1/2016 | Zhao | 370/254 |
| 2016/0021000 A1 | 1/2016 | Previdi et al. | 370/389 |
| 2016/0191372 A1 | 6/2016 | Zhang | 370/390 |
| 2016/0352654 A1 | 12/2016 | Filsfils et al. | 370/392 |
| 2017/0104673 A1 | 4/2017 | Bashandy et al. | 370/392 |
| 2017/0111277 A1 | 4/2017 | Previdi et al. | 370/392 |
| 2017/0302561 A1 | 10/2017 | Filsfils | 370/389 |
| 2017/0302571 A1 | 10/2017 | Frost | 370/254 |

FOREIGN PATENT DOCUMENTS

| | | | | |
|---|---|---|---|---|
| CN | 101399688 A | 4/2009 | | H04L 12/18 |
| CN | 101496357 A | 7/2009 | | H04L 12/56 |
| CN | 101616466 A | 12/2009 | | H04W 40/02 |
| CN | 101803293 A | 8/2010 | | H04L 12/28 |
| CN | 101841 442 A | 9/2010 | | |
| CN | 102098222 A | 6/2011 | | H04L 12/56 |
| CN | 102132533 A | 7/2011 | | |
| CN | 102299852 A | 12/2011 | | |
| CN | 102498694 A | 6/2012 | | |
| CN | 102714625 A | 10/2012 | | |

OTHER PUBLICATIONS

Eckert, Toerless et al., "Failure Protection for Traffic-Engineered Bit Indexed Explicit Replication", U.S. Appl. No. 15/054,480, filed Feb. 26, 2016; consisting of Specification, Claims, Abstract, and Drawings (76 pages).

Alcatel-Lucent, "Segment Routing and Path Computation Element—Using Traffic Engineering to Optimize Path Placement and Efficiency in IP/MPLS Networks"; Technology White Paper; 2015; 28 pages.

Awduche, D. et al., "Requirements for Traffic Engineering Over MPLS"; Network Working Group; Request for Comments: 2702; Sep. 1999; pp. 1-29.

Awduche, D. et al., "Overview and Principles of Internet Traffic Engineering"; Network Working Group; Request for Comments: 3272; May 2002; pp. 1-71.

Filsfils, C. et al., "Segment Routing Architecture"; draft-ietf-spring-segment-routing-07; Network Working Group, Internet-Draft; Dec. 15, 2015; pp. 1-24.

Filsfils, C. et al., "Segment Routing Use Cases", draft-filsfils-rtgwg-segment-routing-use-cases-02; Network Working Group; Internet-Draft; Oct. 21, 2013; pp. 1-36.

Previdi, S. et al., "IS-IS Extensions for Segment Routing"; draft-ietf-isis-segment-routing-extensions-06; IS-IS for IP Internets, Internet-Draft; Dec. 14, 2015; pp. 1-39.

Psenak, P., et al. "OSPF Extensions for Segment Routing", draft-ietf-ospf-segment-routing-extensions-05; Open Shortest Path First IGP; Internet-Draft; Jun. 26, 2015; pp. 1-29.

Psenak, Peter et al., "Enforcing Strict Shortest Path Forwarding Using Strict Segment Identifiers" U.S. Appl. No. 15/165,794, filed May 26, 2016; consisting of Specification, Claims, Abstract, and Drawings (52 pages).

Aggarwal, R. and Y. Rekhter, Juniper Networks; E. Rosen, Cisco Systems, Inc.; "MPLA Upstream Label Assignment and Context Specific Label Space;" Network Working Group; Internet Draft; Jan. 2005; pp. 1-8.

Awduche, Daniel O., et al., "RSVP-TE: Extensions to RSVP for LSP Tunnels," Network Working Group, Internet-Draft, Feb. 2001, pp. 1-12.

Awduche, Daniel O., et al., "RSVP-TE: Extensions to RSVP for LSP Tunnels," Network Working Group, Request for Comments 3209, Dec. 2001, pp. 1-61.

Backes, P. and Rudiger Geib, "Deutsche Telekom AG's Statement About IPR Related to Draft-Geig-Spring-OAM-Usecase-01," Aug. 23, 2012, pp. 1-2.

Bryant, S. et al., Cisco Systems, "IP Fast Reroute Using Tunnels-draft-bryant-ipfrr-tunnels-03", Network Working Group, Internet-Draft, Nov. 16, 2007, pp. 1-30.

Bryant, S., et al., Cisco Systems, "Remote LFA FRR," draft-ietf-rtgwg-remote-lfa-04, Network Working Group, Internet-Draft, Nov. 22, 2013, pp. 1-24.

Crabbe, E., et al., "PCEP Extensions for MPLS-TE LSP Protection With Stateful PCE Draft-Crabbe-PCE-Stateful-PCT-Protection-00," Network Working Group, Internet-Draft, Apr. 2013, pp. 1-12.

Crabbe, E., et al., Stateful PCE Extensions for MPLS-TE LSPs, draft-crabbe-pce-statement-pce-mpls-te-00; Network Working Group, Internet-Draft, Apr. 15, 2013, pp. 1-15.

Deering, S., et al., Cisco, Internet Protocol, Version 6 (IPv6) Specification, Network Working Group, Request for Comments 2460, Dec. 1998, pp. 1-39.

Farrel, A., et al., Old Dog Consulting, A Path Computation Element (PCE)—Based Architecture, Network Working Group, Request for Comments 4655, Aug. 2006, pp. 1-80.

Farrel, A., et al., Old Dog Consulting, Inter-Domain MPLS and GMPLS Traffic Enginerring—Resource Reservation Protocol-Traffic Enginerring (RSVP-TE) Extensions, Newtork Working Group, Request for Comments 5151, Feb. 2008.

Fedyk, D., et al., Alcatel-Lucent, Generalized Multiprotocol Label Switching (GMPLS) Control Ethernet Provider Backbone Traffic Engineering (PBB-TE), Internet Engineering Task Force (IETF), Request for Comments 6060, Mar. 2011, pp. 1-20.

Filsfils, C., et al., Cisco Systems, Inc., "Segment Routing Architecture," draft-filsfils-rtgwg-segment-routing-00, pp. 1-28.

Filsfils, C., et al., Cisco Sytems, Inc., "Segment Routing Architecture," draft-filsfils-rtgwg-segment-routing-01, Network Working Group, Internet-Draft, Oct. 21, 2013, pp. 1-28.

Frost, D., et al., Cisco Systems, Inc., "MPLS Generic Associated Channel (G-Ach) Advertisement Protocol," draft-ietf-mpls-gach-adv-00, Internet-Draft, Jan. 27, 2012, pp. 1-17.

Frost, D., et al., Cisco Systems, Inc., "MPLS Generic Associated Channel (G-Ach) Advertisement Protocol," draft-ietf-mpls-gach-adv-08, Internet-Draft, Jun. 7, 2013, pp. 1-17.

Frost, D., et al., Cisco Systems, Inc., "MPLS Generic Associated Channel (G-Ach) Advertisement Protocol," Request for Comments 7212, Jun. 2014, pp. 1-23.

Geib, R., "Segment Routing Based OAM Use Case," IETF 87, Gerlin, Jul./Aug. 2013, pp. 1-3.

Geib, R., Deutsch Telekom, "Use Case for a Scalable and Topology Aware MPLS data plan moniotoring System," draft-geib-spring-oam-usecase-00; Internet-Draft, Oct. 17, 2013, pp. 1-11.

Geib, R., Deutsch Telekom, "Use Case for a Scalable and Topology Aware MPLS data plan moniotoring System," draft-geib-spring-oam-usecase-01; Internet-Draft, Feb. 5, 2014, pp. 1-10.

Gredler, H., et al., Juniper Networks, Inc., "Advertising MPLS Labels in IS-IS draft-gredler-isis-label-advertisement-00," Internet-Draft; Apr. 5, 2013; pp. 1-13.

Gredler, H. et al., hannes@juniper.net, IETF87, Berlin, "Advertising MPLS LSPs in the IGP," draft-gredler-ospf-label-advertisement, May 21, 2013; pp. 1-14.

Guilbaud, Nicolas and Ross Cartlidge, "Google~Localizing Packet Loss in a Large Complex Network," Feb. 5, 2013, pp. 1-43.

(56) References Cited

OTHER PUBLICATIONS

Imaizumi, H., et al.; Networks, 2005; "FMEHR: An Alternative Approach to Multi-Path Forwarding on Packed Switched Networks," pp. 198-201.
Kompella, K. et al, Juniper Networks, "Label Switched Paths (LSP) Hierarchy with Generalized Multi-Protocol Label Switching (GMPLS) Traffic Enginerring (TE)," Network Working Group, Request for Comments 4206, Oct. 2005, pp. 1-14.
Kompella, K., et al., Juniper Networks, Inc., "Detecting Multi-Protocol Label Switched (MPLS) Data Plane Failures," Network Working Group, Request for Comments 4379, Feb. 2006, pp. 1-50.
Kompella, K. et al., Juniper Networks,"Virtual Private LAN Service (VPLS) Using BGP for Auto-Discovery and Signaling," Network Working Group, Request for Comments 4761, Jan. 2007, pp. 1-28.
Kumar, N. et al., Cisco Systems, Inc., "Label Switched Path (LSP) Ping/Trace for Segment Routing Networks Using MPLS Dataplane," draft-kumar-mpls-spring-lsp-ping-00, Oct. 21, 2013, pp. 1-12.
Kumar, N. et al, "Label Switched Path (LSP) Ping/Trace for Segment Routing Networks Using MPLS Dataplane," draft-kumarkini-mpls-spring-lsp-ping-00, Network Work Group, Internet-Draft, Jan. 2, 2014, pp. 1-15.
Previdi, S. et al., Cisco Systems, Inc., "Segment Routing with IS-IS Routing Protocol, draft-previdi-filsfils-isis-segment-routing-00," IS-IS for IP Internets, Internet-Draft, Mar. 12, 2013, pp. 1-27.
Previdi, S. et al., Cisco Systems, Inc., "Segment Routing with IS-IS Routing Protocol, draft-previdi-filsfils-isis-segment-routing-02," Internet-Draft, Mar. 20, 2013, A55 pp. 1-27.
Raszuk, R., NTT I3, "MPLS Domain Wide Labels," draft-raszuk-mpls-domain-wide-labels-00, MPLS Working Group, Internet-Draft, Jul. 14, 2013, pp. 1-6.
Rosen, E. et al., Cisco Systems, Inc., "BGP/MPLS VPNs", Network Working Group, Request for Comments: 2547; Mar. 1999, pp. 1-26.
Sivabalan, S., et al.; "PCE-Initiated Traffic Engineering Path Setup in Segment Routed Networks; draft-sivabalan-pce-segmentrouting-00.txt," Internet Engineering Task Force, IETF; Standard Working Draft, Internet Society (ISOC) 4, Rue Des Falaises CH-1205, Geneva, Switzerland, Jun. 2013, pp. 1-16.
Tian, Albert J. et al., Redback Networks, "Source Routed MPLS LSP Using Domain Wide Label, draft-tian-mpls-lsp-source-route-01.txt", Network Working Group, Internet Draft, Jul. 2004, pp. 1-12.
Vasseur, JP, et al.; Cisco Systems, Path Computation Element (PCE) Communication Protocol (PCEP): Request for Comments: 5440, Internet Engineering Task Force, IETF; Standard, Internet Society (ISOC) 4, Rue Des Falaises CH-1205, Geneva, Switzerland, chapters 4-8, Mar. 2009; pp. 1-87.
Wijnands, Ijsbrand and Bob Thomas, Cisco Systems, Inc,; Yuji Kamite and Hitoshi Fukuda, NTT Communications; "Multicast Extensions for LDP;" Network Working Group; Internet Draft; Mar. 2005; pp. 1-12.
Eckert, Toerless et al., "Traffic Engineering for Bit Indexed Explicit Replication", U.S. Appl. No. 14/814,575, filed Jul. 31, 2015; consisting of Specification, Claims, and Abstract (75 pages); and Drawings (18 sheets).
Eckert, Toerless et al., "Traffic Engineering for Bit Indexed Explicit Replication", U.S. Appl. No. 14/862,915, filed Sep. 23, 2015; consisting of Specification, Claims, and Abstract (75 pages); and Drawings (18 sheets).
Cisco Systems, Inc., "Introduction to Intermediate System-to-Intermediate System Protocol," published 1992-2002; pp. 1-25.
Eckert, T., "Traffic Engineering for Bit Index Explicit Replication BIER-TE, draft-eckert-bier-te-arch-00," Network Working Group, Internet-Draft, Mar. 5, 2015, pp. 1-21.
Eckert, T., et al., "Traffic Engineering for Bit Index Explicit Replication BIER-TE, draft-eckert-bier-te-arch-01," Network Working Group, Internet-Draft, Jul. 5, 2015, pp. 1-23.
Nainar, Nagendra Kumar et al., "Reroute Detection in Segment Routing Data Plane"; U.S. Appl. No. 15/266,498, filed Sep. 15, 2016; consisting of Specification, Claims, Abstract, and Drawings (61 pages).
Filsfils, Clarence et al., "Segment Routing Into a Label Distribution Protocol Domain"; U.S. Appl. No. 15/280,262, filed Sep. 29, 2016; consisting of Specification, Claims, Abstract, and Drawings (28 pages).
Filsfils, C., et al., Cisco Systems, Inc., "Segment Routing Architecture," draft-filsfils-rtgwg-segment-routing-00, Jun. 28, 2013; pp. 1-28.
Frost, Daniel C. et al., "MPLS Segment Routing"; U.S. Appl. No. 15/637,744, filed Jun. 29, 2017; consisting of Specification, Claims, Abstract, and Drawings (26 pages).
Filsfils, Clarence et al., "Seamless Segment Routing"; U.S. Appl. No. 15/639,398, filed Jun. 30, 2017; consisting of Specification, Claims, Abstract, and Drawings (31 pages).
Previdi, Stefano B. et al., "Segment Routing Extension Headers", U.S. Appl. No. 15/677,210, filed Aug. 15, 2017; consisting of Specification, Claims, Abstract, and Drawings (58 pages).
Akiya, N. et al., "Seamless Bidirectional Forwarding Detection (BFD) for Segment Routing (SR)"; draft-akiya-bfd-seamless-sr-00; Internet Engineering Task Force; Internet-Draft; Jun. 7, 2013; 7 pages.
Akiya, N. et al., "Seamless Bidirectional Forwarding Detection (BFD) for Segment Routing (SR)"; draft-akiya-bfd-seamless-sr-01; Internet Engineering Task Force; Internet-Draft; Dec. 5, 2013; 7 pages.
Akiya, N. et al., "Seamless Bidirectional Forwarding Detection (BFD) for Segment Routing (SR)"; draft-akiya-bfd-seamless-sr-02; Internet Engineering Task Force; Internet-Draft; Jun. 7, 2014; 7 pages.
Akiya, N. et al., "Seamless Bidirectional Forwarding Detection (BFD) for Segment Routing (SR)"; draft-akiya-bfd-seamless-sr-03; Internet Engineering Task Force; Internet-Draft; Aug. 23, 2014; 7 pages.
Akiya, N. et al., "Seamless Bidirectional Forwarding Detection (BFD) for Segment Routing (SR)"; draft-akiya-bfd-seamless-sr-04; Internet Engineering Task Force; Internet-Draft; Feb. 23, 2015; 7 pages.
Akiya, N., "Segment Routing Implications on BFD"; Sep. 9, 2013; 3 pages.
Aldrin, S., et al., "Seamless Bidirectional Forwarding Detection (S-BFD) Use Cases"; draft-ietf-bfd-seamless-use-case-08; Network Working Group; Internet-Draft; May 6, 2016; 15 pages.
Filsfils, C. et al., Cisco Systems, Inc., "Segment Routing Interoperability with LDP"; draft-filsfils-spring-segment-routing-ldp-interop-01.txt; Apr. 18, 2014, pp. 1-16.
Filsfils, C. et al.; "Segment Routing Use Cases"; draft-filsfils-rtgwg-segment-routing-use-cases-01; Network Working Group; Internet-Draft; Jul. 14, 2013; pp. 1-46.
Filsfils, C. et al., "Segment Routing with MPLS Data Plane", draft-ietf-spring-segment-routing-mpls-05; Network Working Group; Internet-Draft; Jul. 6, 2016; 15 pages.
Kumar, N. et al, "OAM Requirements for Segment Routing Network"; draft-kumar-spring-sr-oam-requirement-00; Spring; Internet-Draft; Feb. 14, 2014; 6 pages.
Kumar, N. et al, "OAM Requirements for Segment Routing Network"; draft-kumar-spring-sr-oam-requirement-01;Spring; Internet-Draft; Jul. 1, 2014; 6 pages.
Kumar, N. et al, "OAM Requirements for Segment Routing Network"; draft-kumar-spring-sr-oam-requirement-02; Spring; Internet-Draft; Dec. 31, 2014; 6 pages.
Kumar, N. et al, "OAM Requirements for Segment Routing Network"; draft-kumar-spring-sr-oam-requirement-03; Spring; Internet-Draft; Mar. 9, 2015; 6 pages.
Kumar, N. et al., "Label Switched Path (LSP) Ping/Trace for Segment Routing Networks Using MPLS Dataplane", draft-ietf-mpls-spring-lsp-ping-00; Network Work Group; Internet Draft; May 10, 2016; 17 pages.

(56) References Cited

OTHER PUBLICATIONS

Pignataro, C. et al., "Seamless Bidirectional Forwarding Detection (S-BFD) for IPv4, IPv6 and MPLS", draft-ietf-bfd-seamless-ip-06; Internet Engineering Task Force; Internet-Draft; May 6, 2016; 8 pages.

Pignataro, C. et al., " Seamless Bidirectional Forwarding Detection (S-BFD)"; draft-ietf-bfd-seamless-base-11; Internet Engineering Task Force; Internet-Draft; May 6, 2016; 21 pages.

Previdi, S. et al., "IS-IS Extensions for Segment Routing"; draft-ietf-isis-segment-routing-extensions-05; IS-IS for IP Internets, Internet-Draft; Jun. 30, 2015; pp. 1-37.

* cited by examiner

ENCODING EXPLICIT PATHS AS SEGMENT ROUTING SEGMENT LISTS

RELATED APPLICATIONS

This application claims the domestic benefit under Title 35 of the United States Code § 119(e) of U.S. Provisional Patent Application Ser. No. 61/791,242, entitled "Segment Routing," filed Mar. 15, 2013, which is hereby incorporated by reference in its entirety and for all purposes as if completely and fully set forth herein.

FIELD OF THE INVENTION

This application relates generally to network routing and, more particularly, to generating segment lists.

BACKGROUND OF THE INVENTION

Packet forwarding is a process of relaying packets from one communication link to another by nodes in a network. A packet is a formatted unit of data that typically contains control information and payload data. Control information may include: source and destination IP addresses, error detection codes like checksums, sequencing information, etc. Control information is typically found in packet headers and trailers, with payload data in between. Network nodes may take form in one or more routers, one or more bridges, one or more switches, or any other suitable communications processing device.

Segment routing can be used to forward packets. Segment routing utilizes segments, which act as multi-hop or single-hop paths. Two types of segments include nodal segments and adjacency segments. A nodal segment represents a path to a node and can be a one-hop or a multi-hop path. Packets addressed with a given nodal segment ID typically travel along a shortest path to the node represented by the segment ID. An adjacency segment represents a specific one-hop path to a node.

BRIEF DESCRIPTION OF THE DRAWINGS

The present disclosure may be better understood, and its numerous objects, features, and advantages made apparent to those skilled in the art by referencing the accompanying drawings.

DETAILED DESCRIPTION

Overview

Figure 1:
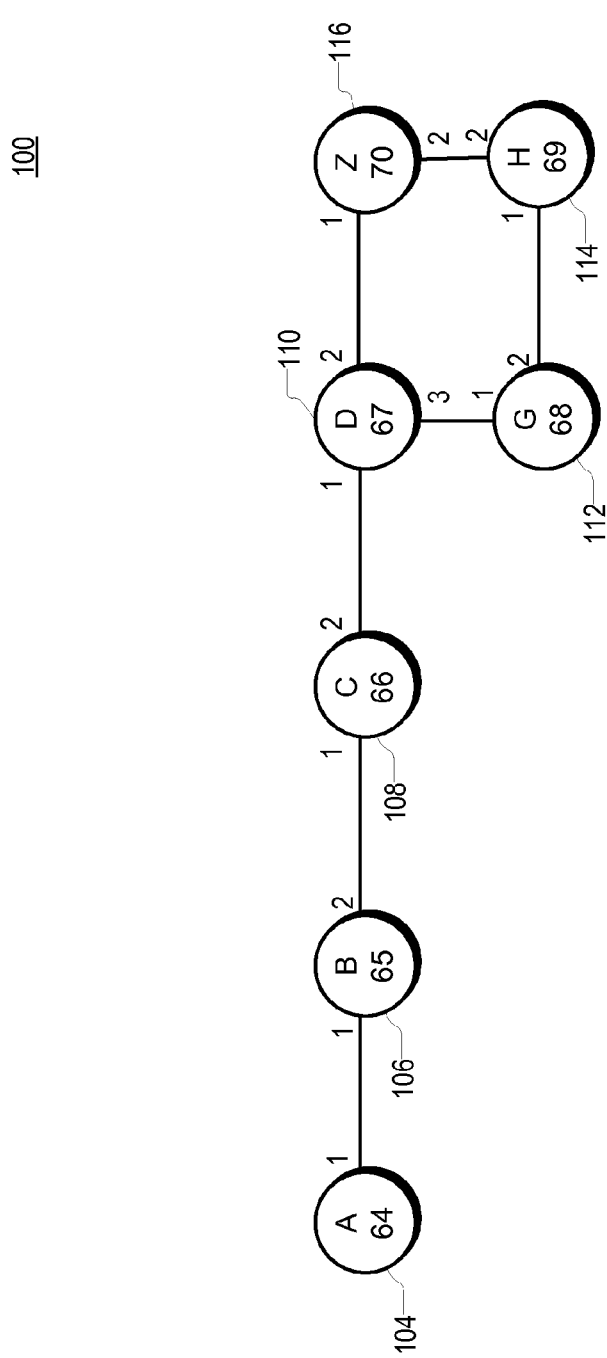
FIG. 1 is a block diagram illustrating an example network.

An system and method are disclosed for generating segment routing (SR) segment lists. In one embodiment, a node receives information that identifies a path from a first node to a second node. Based on the received path, a set of segment identifiers that encodes the path is generated. A packet that is forwarded along the set of segment identifiers travels the received path.

Segment Routing

Segment routing (SR) is a mechanism in which packets can be forwarded using SR forwarding tables and segment identifiers (IDs) attached to packets. SR enables very fast and simple forwarding engines in the dataplane of nodes. SR is not dependent on a particular Open Systems Interconnection (OSI) model data link layer technology to forward packets.

SR nodes (i.e., nodes employing SR) make forwarding decisions based on segment IDs. SR can be employed in provider networks. Packets enter an SR enabled provider network via an ingress provider edge (PE) node, travel hop-by-hop along a segment-switched path (SSP) that includes one or more core nodes, and exit the provider network via an egress PE node. The remaining disclosure will make reference to an autonomous, provider network that operates under one administrative domain. In general a provider network may contain a contiguous set of nodes.

Segment IDs are short (relative to an IP address or a FEC), fixed-length identifiers. Segment IDs may correspond to topological segments of a provider network or services provided by nodes thereof. Topological segments can be one-hop paths to SR nodes, or they can be multi-hop paths to SR nodes. Topological segments act as sub-paths that can be combined to form an SSP. Stacks of segment IDs can represent SSPs as will be described below. SSPs can be associated with FECs. Thus segment ID stacks may correspond to FECs.

There are several types of segment IDs including but not limited to: nodal segment IDs, adjacency segment IDs, and service segment IDs. A nodal segment ID represents a one-hop or a multi-hop, shortest path (SPT) within the provider network to an SR node associated with the nodal segment ID. Nodal segment IDs are assigned to respective SR nodes within the provider network so that no two SR nodes in the provider network are assigned the same nodal segment ID. In one embodiment, all assigned nodal segment IDs are selected from a predefined ID range (e.g., [64, 5000]) for the provider network. The range for nodal segment IDs may be different from a predefined range for labels.

Nodal segment IDs can be mapped in memory to unique identifiers. For purposes of explanation only, nodal segment IDs are mapped to respective node loopback prefix IP addresses. One of ordinary skill understands that node loopback prefix IP addresses (node prefixes for short) distinguish the SR nodes from each other within the provider network. The node prefixes can be used by link state protocols such as open shortest path first (OSPF) or intermediate system to intermediate system (IS-IS), or modifications thereof, operating in the control plan of an SR node to identify egress interfaces for shortest paths (SPTs) to respective SR nodes. Once identified, the SPT egress interfaces can be mapped to nodal segment IDs within an SR forwarding table as the SR forwarding table is created or subsequently updated.

An adjacency segment ID represents a link between adjacent SR nodes. For purposes of explanation only, this disclosure will refer to a link between two contiguous nodes as an adjacency segment (hereafter adjacency). Adjacencies can be uniquely identified in the provider network. For purposes of explanation only, this disclosure will identify an adjacency (hereafter adjacency-ID) using the node prefixes of nodes between which the adjacency is immediately positioned. To illustrate, for an adjacency between two nodes identified by node prefix X and node prefix Y, the adjacency will be identified herein as adjacency-ID XY. This disclosure will presume that only one adjacency exists between nodes in the provider network, it being understood the present disclosure should not be limited thereto. As such, adjacencies are unique in the provider network of this disclosure. Since adjacencies are unique, it follows that adjacency-IDs are likewise unique. Adjacency-IDs should not be confused with adjacency segment IDs; adjacency segment IDs may not be unique within the provider network domain.

Each SR node can assign a distinct adjacency segment ID for each of the SR node's adjacencies. Separate SR nodes may assign the same adjacency segment ID. Adjacency segment IDs, however, are locally significant; separate SR nodes may assign the same adjacency segment ID, but that adjacency segment ID represents distinct adjacencies. In one embodiment, adjacency segment IDs are selected from a predefined range that is outside the predefined range for nodal segment IDs.

Service segment IDs correspond to packet services performed by SR nodes such as deep packet inspection (DPI) and/or filtering. Each SR node can assign a distinct service segment ID for each of the SR node's packet services. For the purposes of explanation only, a node will offer no more than one service. Service segment IDs are locally significant. Like adjacency-IDs, separate SR nodes may assign the same service segment ID for their respective services. Service segment IDs can be selected from the same range as the adjacency segment IDs, or service segment IDs can selected from a predefined range that is distinct from the ranges for adjacency segment IDs and/or nodal segment IDs. The service segment IDs can be assigned based on service type, it being understood the present disclosure should not be limited thereto. As an example, adjacency segment ID 5001 is always mapped to deep packet inspection within the provider network, regardless of the node or nodes that perform the service.

SR nodes can advertise their nodal segment IDs, adjacency segment IDs, service segment IDs, and node prefixes to other SR nodes in the provider network using a protocol such as interior gateway protocol (IGP) or a modification thereof. SR nodes can use the nodal segment IDs, adjacency segment IDs, service segment IDs, node prefixes, and/or other information to create or update SR forwarding tables and/or segment ID stacks.

In one embodiment the SR nodes can advertise their nodal segment ID/node prefix pairs, adjacency segment ID/adjacency-ID pairs, and/or service segment ID/node prefix pairs. The control planes of an SR node can receive and use the nodal segment ID/node prefix pairs and a link-state protocol such as IS-IS or OSPF, or modified versions thereof, to identify egress interfaces for SPTs to SR nodes. An SPT egress interface, once identified, can be mapped to its respective nodal segment ID in the node's SR forwarding table. Nodes also map their adjacency segment IDs to egress interfaces for respective adjacencies in SR forwarding tables. Because adjacency segment IDs are locally significant, however, adjacency segment IDs should only be mapped in SR forwarding tables of the nodes that advertise the adjacency segment IDs. In other words, an SR node that advertises an adjacency segment ID/adjacency-ID pair should be the only node in the provider network that has a SR forwarding table that maps the adjacency segment ID to an egress interface connected to an adjacency identified by the adjacency-ID. Service segment IDs are also locally significant and should only be mapped in the nodes in which they are advertised. Unlike adjacency segment IDs, however, service segment IDs are not mapped to egress interfaces. Rather, the service segment IDs are mapped to respective services that can be implemented by the node.

Segment Routing (SR) enables segment-switched paths (SSPs), which can be used for transporting packets through the provider network. SSPs are typically associated with FECs, and can be established for a variety of purposes, such as to guarantee a certain level of performance. Packets associated with the same FEC will typically follow the same SSP of SR nodes through the provider network. Nodes in SSPs make forwarding decisions based on segment IDs, not based on the contents (e.g., destination IP addresses) of packets. As such, packet forwarding in SSPs is not dependent on a particular Layer 2 technology.

SR nodes can use nodal segment IDs, adjacency segment IDs, and service segment IDs they receive in advertisements from other SR nodes in order to create ordered lists of segment IDs (i.e., segment ID stacks). Segment ID stacks correspond to SSPs, respectively, that forward packets between nodes (e.g., SR enabled ingress and egress nodes) in the provider network. Segment IDs in a stack may correspond to respective segments or sub-paths of a corresponding SSP. When an SR source node (e.g., an SR ingress PE node) receives a packet, the SR source node can calculate a FEC for the packet. The SR source node uses the FEC it calculates to select a segment ID stack mapped thereto. The SR source node can add the selected segment ID stack to a header, and then attach the header to the packet. The packet with attached stack can traverse the segments of the SSP in an order that corresponds to the list order of the segment IDs in the stack. A forwarding engine operating in the dataplane of each SR node can use a segment ID within the stack and an SR forwarding table in order to forward the packet and header to the next node in the SSP. As the packet and attached header are forwarded along the SSP in a hop-by-hop fashion, the attached stack of segment IDs remains unchanged in one embodiment.

Generating Segment Lists for Explicit Paths

In order to generate a segment stack, a node or any other path computation element (PCE) employs an algorithm to convert, or encode, a desired path through a network into a list of segments that, when traversed by a packet, cause the packet to travel along the path. A nodal segment identifier, such as can be included in a segment stack for an SSP, identifies a particular node, e.g., the node at which the nodal segment terminates, or is rooted. However, in an example in which the nodal segment is a multi-hop path, intermediate nodes along the path need not be specifically identified to forward data along the nodal segment. Only the destination node associated with the nodal segment is specified. Traffic is typically forwarded along a shortest path to the destination node. This is highly efficient as the entire path need not be specified, for example in a packet header. However, this may present challenges in using SR to route packets along an explicit path. The shortest path, and thus the set of intermediate nodes traversed by traffic forwarded along the nodal segment, can change as nodes are added and removed from the network and as other performance characteristics change. Therefore, even if a nodal segment identifier is known, which nodes are traversed by packets forwarded along the nodal segment may be unknown. Determining which nodes are used to implement a nodal segment is further complicated by the fact that multiple equal cost paths may exist, and traffic forwarded along the nodal segment may be shared between the equal cost paths. This relates to the inherent equal cost multi-path (ECMP) property of nodal segments which enables packets having a unique nodal segment ID to be forwarded along multiple alternative equal cost paths.

In some cases, traffic should be forwarded via an explicit path comprising a predefined set of nodes. There are various reasons why traffic should be forwarded via an explicit path. For example, certain nodes may provide services, such as deep packet inspection. Additionally, an explicit path may be desired due to service level agreements, traffic engineering concerns, or political reasons.

In order to ensure that traffic follows an explicit path, an algorithm generates a list of segments (nodal and/or adjacency) that encodes the explicit path. Traffic forwarded using the list of segments traverses the explicit path. Input to the algorithm includes an explicit path from a source node to a destination node, including intermediate nodes. The explicit path is specified as a list of links and/or nodes. The algorithm also utilizes a description of the topology of the network, such as a link state database. As an output, the algorithm produces a list of segments that encodes the explicit path.

FIG. 1 shows an example of a portion of a segment routing (SR) enabled network 100. Network 100 consists of nodes 104-116. Nodes 104-116 can be implemented as SR nodes, which are nodes that are configured to employ SR. Nodes 104-116 are assigned unique nodal segment IDs 64-70, respectively. In some embodiments, a user, such as a network administrator, detects a node coming online or joining a network and assigns the node a nodal segment ID. In response to being assigned a nodal segment ID, the node advertises the nodal segment ID to other nodes in the network.

Each of the nodes 104-116 have interfaces that are identified as shown. For example, node 67 has three interfaces designated 1-3, respectively. Each of the nodes 104-116 is assigned a node prefix that is unique within network 100. Node prefixes A-D are provided for nodes 104-110, respectively, node prefixes G-H are provided for nodes 112-114 respectively, and node prefix Z is provided for node 116. These node prefixes are unique within network 100 and can be used for several purposes such as calculating the topology of network 100, which in turn can be used to calculate shortest path trees (SPTs). Nodes 104-116 can also assign locally significant adjacency segment IDs and/or service segment IDs. For example, node 110 can assign adjacency segment IDs 9001-9003 for adjacencies DC, DG, and DZ, respectively. Node 67 can assign, for example, service segment ID 5001 for a deep packet inspection service provided by the node.

Data, such as packets, flow between nodes along segment switched paths (SSPs). An SSP can be represented by a segment list. The segment list is inserted into a packet's header, and packets are forwarded along the nodes identified in the segment list. When an explicit path is specified for a packet, the explicit path is encoded in a segment list. Additional details and examples of several aspects of an algorithm to generate segment lists are provided in the following figures.

Nodal Segments Implementation

Figure 2:
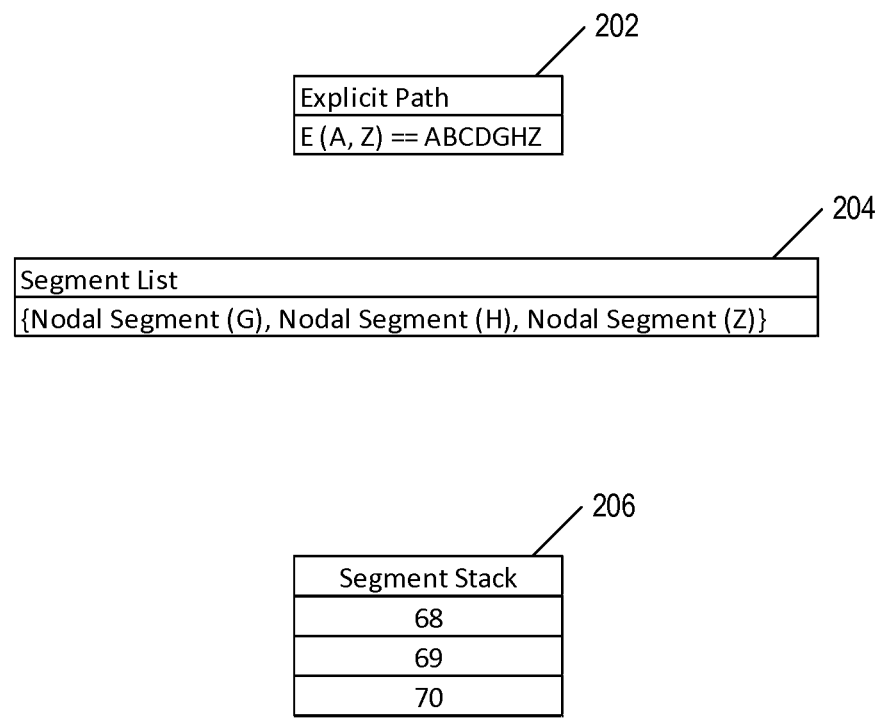
FIG. 2 is a graphical representation of an example explicit path, example segment list, and example segment stack.

FIG. 2 shows an example of an explicit path 202 and a list of segments 204 that encodes the explicit path, given the topology illustrated in FIG. 1. For the purpose of this disclosure, it will be assumed, unless otherwise noted, that the links in FIG. 1 all have the same cost. FIG. 2 also shows segment stack 206, which can be added to a packet's header to direct the packet along the explicit path. The segment list and segment stack can be calculated using a recursive algorithm applied, for example, by a path computation element, or by a node in the network.

Explicit path 202 represents a path from a source node, e.g., node A, to a destination node, e.g., node Z. Packets travelling explicit path 202 traverse the intermediate nodes B, C, D, G, and H. Explicit path 202 is given as an input to the algorithm. The topology of network 100 of FIG. 1 is also given. In order to encode explicit path 202 as a list of segments, the algorithm determines the farthest node along explicit path 202 such that the shortest path from the source node to the farthest node exactly encodes the subset of the explicit path from the source node to the farthest node. Exactly encoding the subset of the explicit path means that packets will traverse each node between the source node and the farthest node that is specified as part of the explicit path. In order to guarantee that each node is traversed, there can be no ambiguity, such as equal cost paths, between the source node and the farthest node. Once an ambiguity is detected, the segment is ended and a new segment begun. That is, the subset of nodes that comprises nodes between the source and the farthest node (inclusive) is replaced by a nodal segment to the farthest node.

In the example of FIG. 2, the algorithm calculates a shortest path from Node A to Node B. Since there is only one shortest path from Node A to Node B, Node B is unambiguously reachable from Node A, and Node B becomes the farthest node that is unambiguously reachable from Node A. Node C is the next node on explicit path 202. The algorithm then calculates a shortest path from Node A to Node C. Since there is only one shortest path from Node A to Node C, Node C is unambiguously reachable from Node A and Node C becomes the next farthest node. Node D is the next node in explicit path 202. The algorithm then calculates a shortest path from Node A to Node D. Since there is only one shortest path from Node A to Node D, Node D is unambiguously reachable from Node A and Node D becomes the next farthest node. Node G is the next node in explicit path 202. The algorithm then calculates a shortest path from Node A to Node G. Since there is only one shortest path from Node A to Node G, Node G is unambiguously reachable from Node A and Node G becomes the next farthest node. Note that while Node G is reachable by an alternate route, namely through Node Z and Node H, the route DZHG is longer than the route DG. Therefore, no ambiguity exists. Node H is the next node in explicit path 202. The algorithm then calculates a shortest path from Node A to Node H. The Node H cannot be reached without ambiguity. There are two equal cost paths from Node A to Node H, namely ABCDZH and ABCDGH. Therefore, Node G is the farthest node along explicit path 202 that is unambiguously reachable from Node A. Once the algorithm determines the farthest node, the algorithm generates a nodal segment ending at the node. As shown in segment list 204, the first segment ID in the segment list is the nodal segment ID corresponding to a nodal segment ending at Node G. While the example describes the algorithm calculating shortest paths at each step, the shortest path calculations can be performed in a single step prior to executing the algorithm and stored, e.g., in a forwarding table. In this example, the algorithm can access the shortest path information from the forwarding table rather than performing the shortest path calculations on the fly.

After a farthest node is reached, and a first segment is added to the segment list, the algorithm determines a new farthest node from the previous farthest node that encodes the subset of the explicit path from the previous farthest node to the new farthest node. The algorithm substitutes the previous farthest node as the source and determines the farthest node along the explicit path that can be unambiguously reached from the new source. Next, the algorithm replaces the subset of the explicit path from the previous farthest node (the new source) to the new farthest node with a nodal segment to the new farthest node, and so on until the end of the explicit path is reached.

In the example of FIG. 2, the algorithm calculates a shortest path from Node G, which was the previous farthest node along explicit path 202. The next node in explicit path 202 is Node H. The algorithm calculates a shortest path from Node G to Node H. Since there is only one shortest path from Node G to Node H, Node H is unambiguously reachable from Node G and Node H becomes the next farthest node. Node Z is the next node in explicit path 202. There are two equal cost paths from Node G to Node Z, namely GDZ and GHZ. Therefore, Node Z cannot be unambiguously reached from Node G and Node H is the farthest node along explicit path 202 that is unambiguously reachable from Node G. As shown in segment list 204, a segment ID corresponding to Node H is the next segment ID added to the list. Finally, the algorithm calculates a shortest path from the previous farthest node, namely Node H, to the next node on explicit path 202, namely Node Z. Then the algorithm adds a segment ID corresponding to Node Z to segment list 204. Segment list 204 can be converted to segment stack 206 using the nodal segment IDs from FIG. 1. Thus, given explicit path 202 and the topology of FIG. 1, the algorithm generates segment stack 206. In one embodiment, a node can insert segment stack 206 into a packet's header to cause the packet to be forwarded along the explicit path.

In the example of FIG. 2, the algorithm generates a segment stack that includes only nodal segments, and no adjacency segments, even though two of the nodal segments represented one-hop paths, namely nodal segment H (representing the hop from Node G to Node H) and nodal segment Z (representing the hop from Node H to Node Z). A user can configure the algorithm to prefer nodal segments over adjacency segments. This may be desirable because nodal segments inherently support equal cost multi-path (ECMP), which supports reducing the number of segment identifiers needed to express a path. However, in some cases, it may be impossible to encode a one-hop sub-path as a nodal segment. For example, due to high link cost on a given link between a first node and a second node, the shortest path from the first node to the second node may actually be a multi-hop path through one or more other nodes. In this example, an adjacency segment can be used to force traffic to flow along the explicit path. The user can specify that nodal segments should always be used when possible, or can configure the algorithm to use adjacency segments for one-hop sub-paths.

Figure 3:
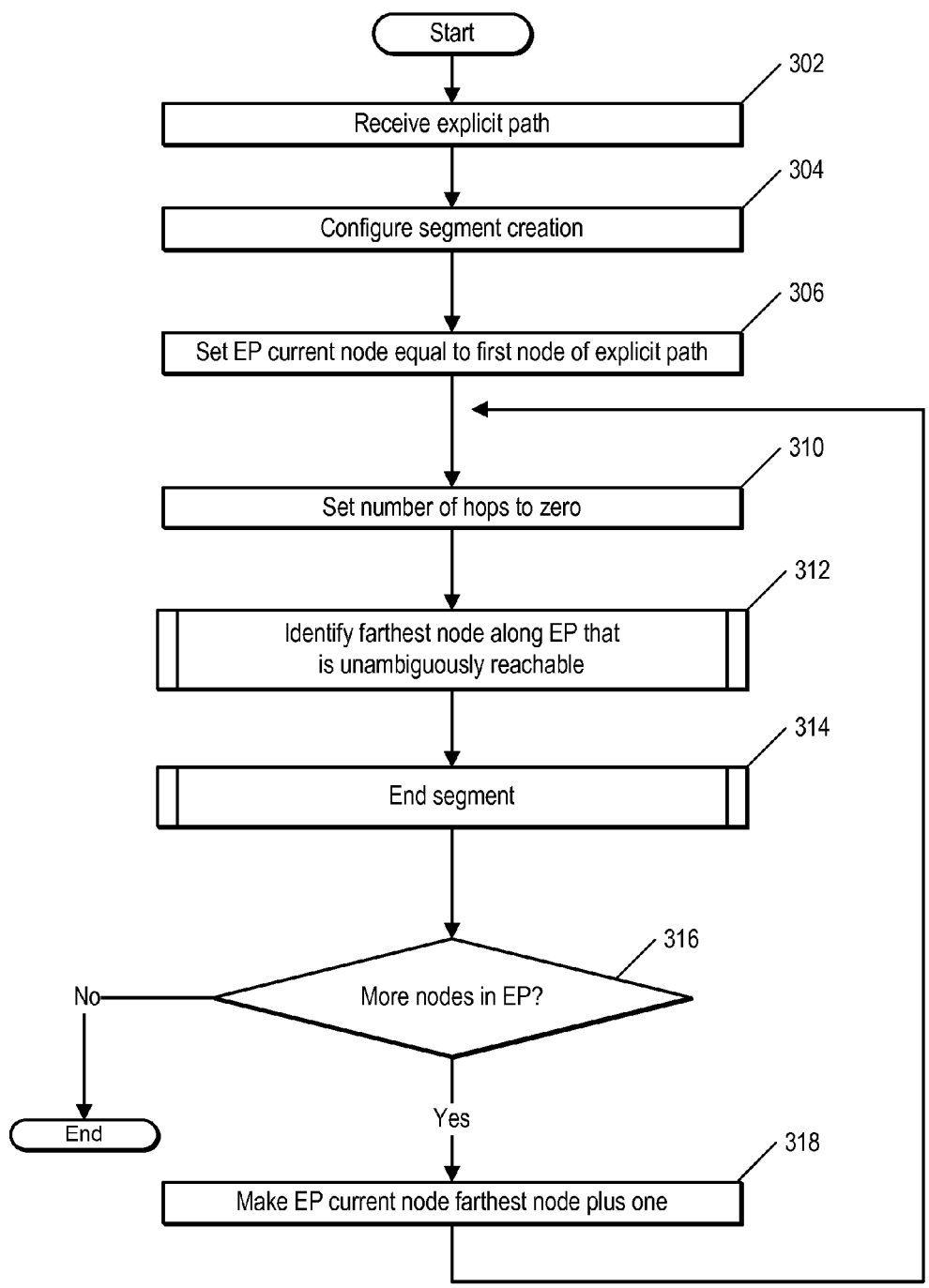
FIG. 3 is a flow chart illustrating an example process employed by a node of FIG. 1.

FIG. 3 is a flowchart showing one example of an algorithm used to generate a list of segments when given an explicit path for a particular topology. Packets that are forwarded along the list of segments traverse the nodes in the explicit path. The algorithm can be performed by a node, such as shown in FIG. 1, or any other path computation element. The algorithm generates a list of segments that encodes an explicit path through the topology, as shown in FIG. 1.

The method begins at 302, in response to the node receiving an explicit path, such as explicit path 202 of FIG. 2. The explicit path can be received as information identifying a list of nodes and/or segments between a source and a destination.

At 304, the node configures segment creation. In one embodiment, this involves specifying a preference for segment type, such as nodal segment or adjacency segment. For example, the algorithm can detect that either a one-hop nodal segment or an adjacency segment can be used to encode a portion of an explicit path. The algorithm can decide which type of segment to use based on whether the configuration information specifies a preference for nodal segments or adjacency segments. The node can perform this operation in response to receiving the configuration information from a user, where the information specifies the user's preference.

At 306, the algorithm determines an identifier associated with the first node in the explicit path (EP). The identifier can be a node prefix, segment ID, or any other information that identifies the first node in the explicit path. In one embodiment, the algorithm sets a variable, for example, a variable entitled "EP current node," equal to the identifier of the first node of the explicit path equal. The EP current node variable contains information identifying a node which is the first node of a segment that will be included in the lists of segments encoding the explicit path. Shortest paths are calculated from EP current node towards the next-hop node of the explicit path. EP current node can be implemented as a variable storing a value, a pointer, or using any other means of identifying a node.

At 310, the algorithm sets a variable representing the number of hops equal to zero. The node keeps track of the number of hops in a given segment in part to help determine whether an adjacency segment or a nodal segment should be used for the segment, but also to detect when shortest path (e.g., in terms of link costs) is indirect.

At 312, the algorithm identifies the farthest node along the explicit path that is unambiguously reachable. A node is unambiguously reachable if there is only one shortest path to the node from the EP current node. The algorithm iteratively checks each node along the explicit path until a node is found that cannot be unambiguously reached from EP current node. The node prior to that node is the farthest node. Additional details regarding this step are discussed with regard to FIG. 4.

At 314, the algorithm ends the segment at the farthest unambiguously reachable node. Additional details regarding this operation are discussed with regard to FIG. 6. Once the segment has ended, the algorithm determines, at 316, whether more nodes exist in the explicit path. If not, the end (e.g., destination node) of the explicit path has been reached and the explicit path has been completely encoded as a list of segments. Otherwise, if more nodes do exist in the explicit path, the algorithm updates, at 318, EP current node value to identify the node in the explicit path that is one node beyond the farthest node identified at 312. The previous EP current node, the farthest node that was unambiguously reachable, and any intervening nodes, were encoded into a segment and added to the segment stack. Now, a new segment is begun at the next node in the explicit path and a subsequent iteration of the algorithm is performed.

Figure 4:
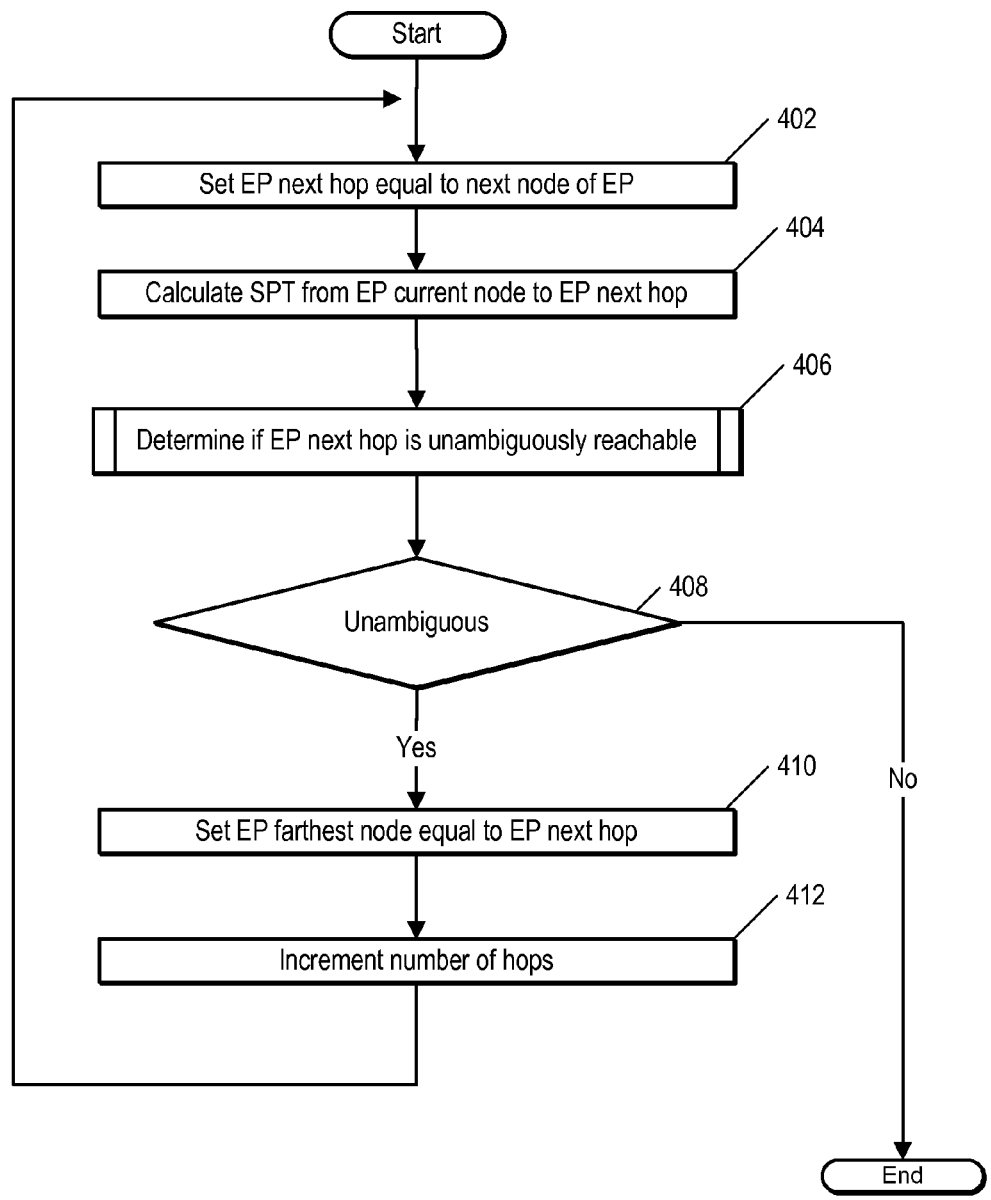
FIG. 4 is a flow chart illustrating an example process employed by a node of FIG. 1.

FIG. 4 shows additional details of identifying the farthest node along an explicit path that is unambiguously reachable from a given starting point. At 402, the algorithm encoding the explicit path sets a variable, for example a variable entitled "EP next hop" equal to the next node in the explicit path. The next node is the node adjacent to EP current node, in the first iteration. In the example of FIG. 2, EP current node is initially set to Node A and EP next hop is initially set to Node B.

At 404, the algorithm calculates a shortest path from EP current node toward EP next hop. At 406, the algorithm determines whether EP next hop is unambiguously reachable from EP current node. In order to be unambiguously reachable, there must be one and only one shortest path from EP current node to EP next hop. Additional details regarding his operation are discussed with regard to FIG. 5. If the node determines, at 408, that EP next hop is not unambiguously reachable, the method ends. Otherwise, at 410, the algorithm sets a variable, for example a variable entitled "EP farthest node" to EP next hop. Then, at 412, the algorithm increments the number of hops variable and returns to 402. In the example above, EP farthest node is set to Node B and after a second iteration of 402, EP next hop is set to Node C. The method shown in FIG. 4 repeats iteratively until a node identified as EP next hop is not unambiguously reachable from EP current node, e.g., because there are two equal cost paths from EP current node to the node.

Figure 5:
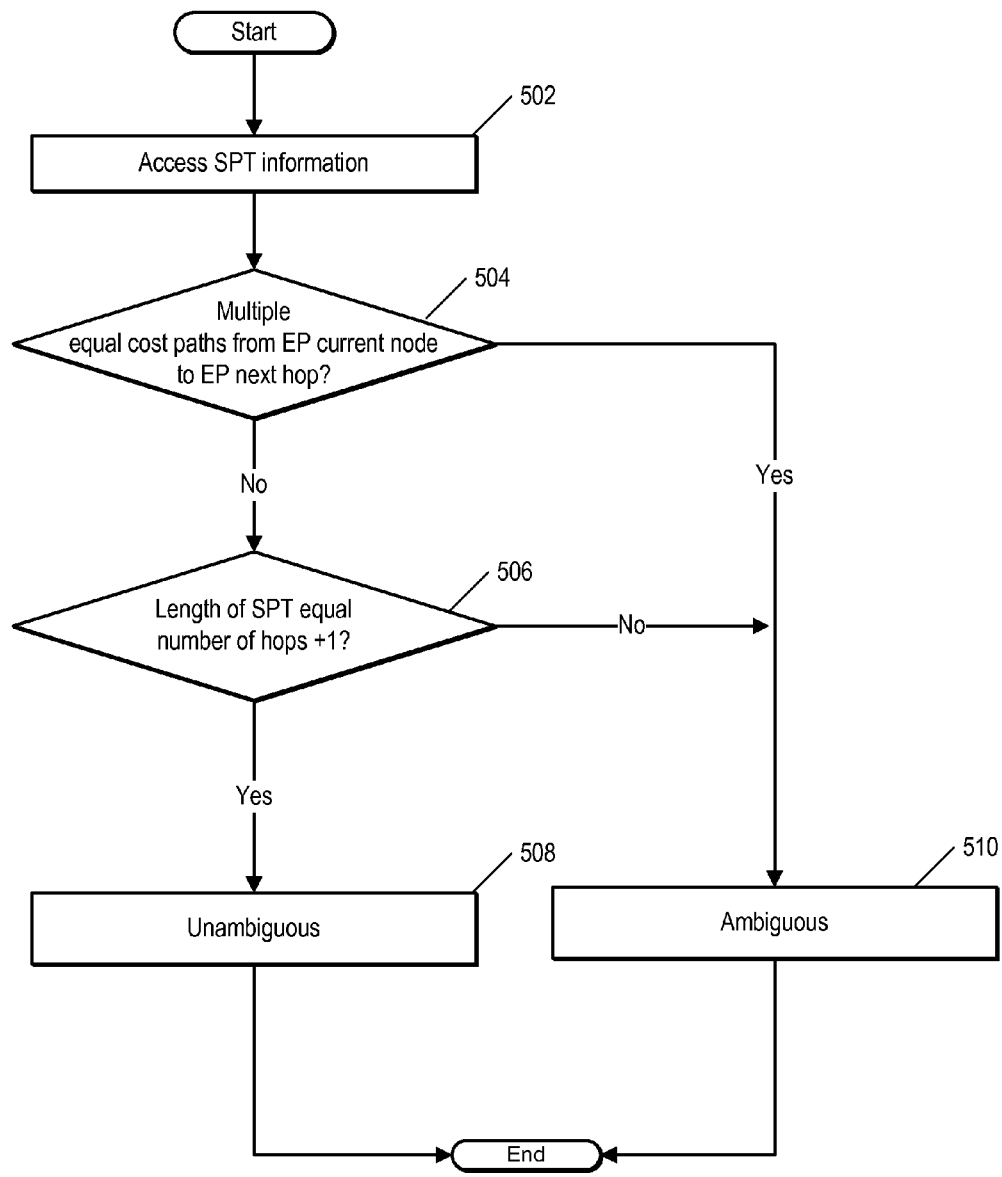
FIG. 5 is a flow chart illustrating an example process employed by a node of FIG. 1.

FIG. 5 shows additional details of determining whether EP next hop is unambiguously reachable, as shown in 406 of FIG. 4. At 502, the algorithm accesses shortest path information, for example the shortest path information calculated at 404 of FIG. 4. This involves determining whether multiple equal cost paths exist between EP current node and EP next hop. If the algorithm determines that multiple equal cost paths from EP current node to EP next hop do exist, at 504, then EP next hop is not unambiguously reachable from EP current node and the algorithm concludes, at 510, that EP next hop is not unambiguously reachable.

If, on the other hand, multiple equal cost paths from EP current node to EP next hop do not exist, the algorithm determines at 506, whether the length of the shortest path between EP current node and EP next hop is equal to the number of hops plus one. If not, the algorithm concludes that EP next hop is not unambiguously reachable from EP current node. This covers the case in which the shortest path between EP current node and EP next hop involves taking a multi-hop path to avoid a single-hop path that traverses a high cost link. For example, the shortest path from Node G to Node H would be GDZH, rather than GH if the link directly connecting Node G and Node H (GH) had a higher cost than the sum of links GD, DZ, and ZH. However, the algorithm would detect that the shortest path was a multi-hop path that diverged from the explicit path, and would conclude that the next hop (in this example Node H, was not unambiguously reachable.

If there is only one shortest path from EP current node to EP next hop and the length of that shortest path equals the number of hops plus one, the algorithm concludes at 508, that EP next hop is unambiguously reachable from EP current node.

Figure 6:
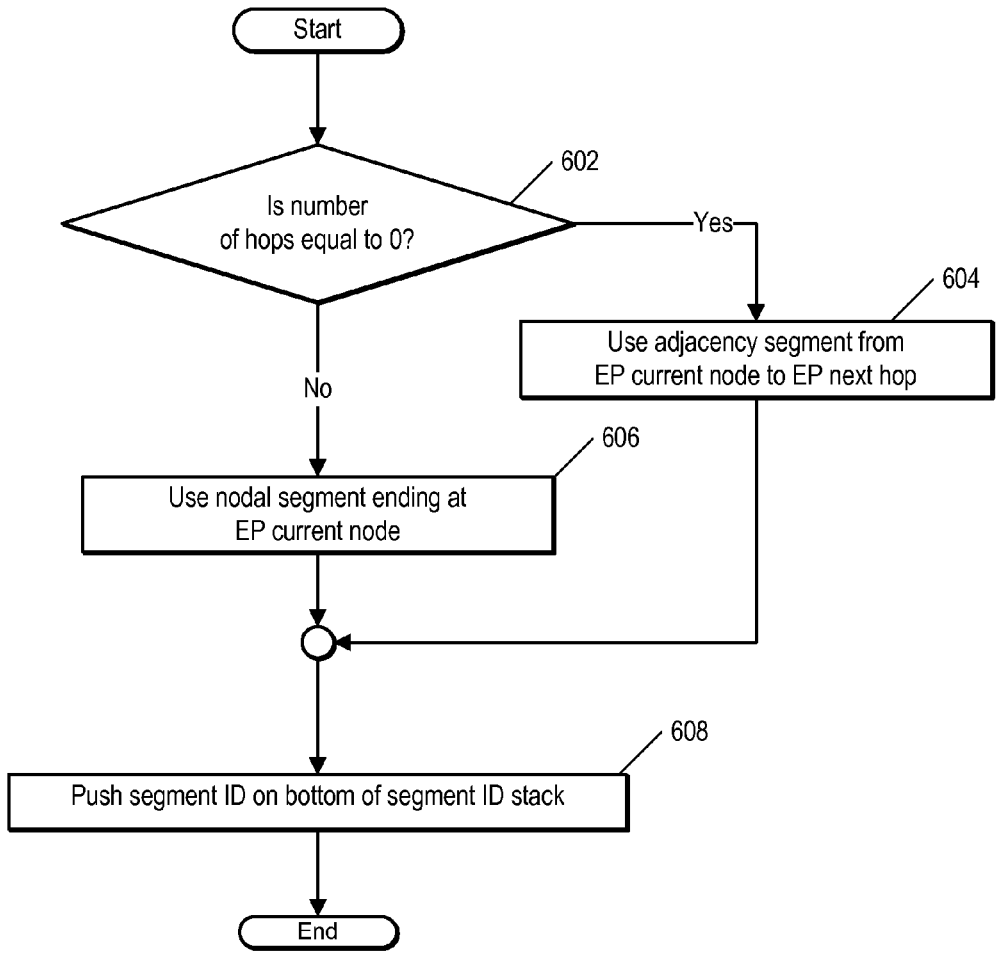
FIG. 6 is a flow chart illustrating an example process employed by a node of FIG. 1.

FIG. 6 shows additional details of ending a segment, as shown at 314 of FIG. 3. At 602, the algorithm determines whether the number of hops is equal to zero. If so, the algorithm determines that an adjacency segment from EP current node to EP next hop should be used, at 604. This is the case where a nodal segment cannot be used to encode a single-hop path. For example, the single-hop path may have a higher cost than a multi-hop shortest path.

Otherwise, at 606, the algorithm uses a nodal segment ending at EP current node. That is, the algorithm specifies that the nodal segment ID associated with the node identified as EP current node be used as the nodal segment identifier for this portion of the explicit path. At 608, the node pushes the nodal segment ID onto the bottom of a segment stack, such as segment stack 206 of FIG. 2.

Adjacency Segments Implementation

The examples discussed above with regard to FIG. 2 included the capability to prefer nodal segments over adjacency segments. In certain contexts, it may be preferred to use adjacency segments. Since adjacency segments do not leverage the same inherent ECMP properties possessed by nodal segments, an algorithm to calculate adjacency segments to encode an explicit path is more straightforward. That is, since the nodes being used to configure an adjacency segment are contiguous, the algorithm can skip operations related to determining whether the nodes are unambiguously reachable or if there are multiple shortest paths between the nodes.

Figure 7:
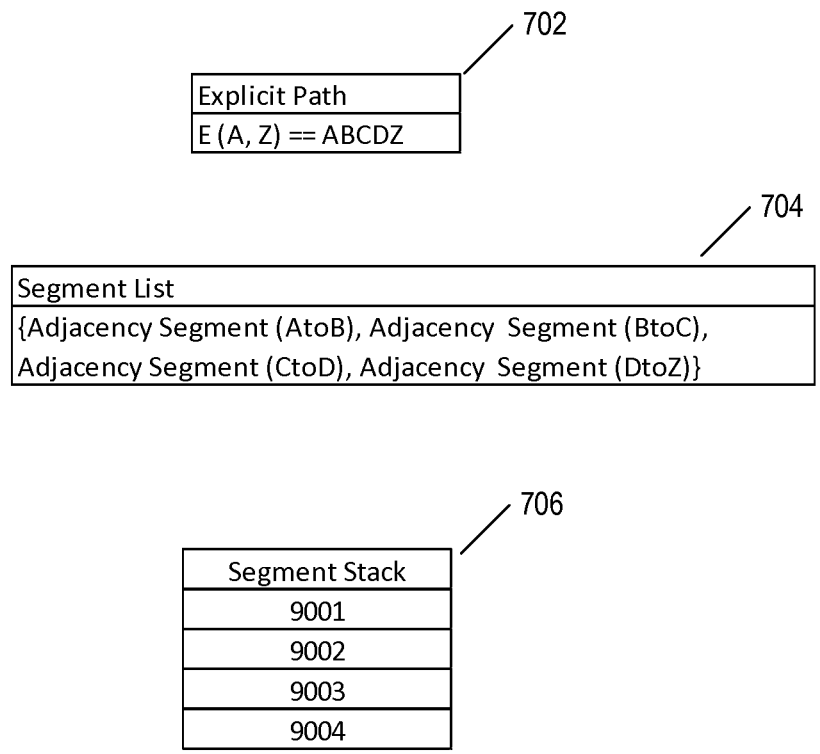
FIG. 7 is a graphical representation of an example explicit path, example segment list, and example segment stack.

FIG. 7 shows an example of an explicit path 702 and a list of segments 704 that encodes the explicit path, given the topology illustrated in FIG. 1. For the purpose of this disclosure, it will be assumed, unless otherwise noted, that the links in FIG. 1 all have the same cost. Explicit path 702 represents a path from a source node, e.g., node A, to a destination node, e.g., node Z. Packets travelling explicit path 702 traverse the intermediate nodes B, C, and D.

FIG. 7 also shows and a segment stack 706 that can be added to a packet's header to direct the packet along the explicit path. The segment list and segment stack can be calculated using a recursive algorithm applied, for example, by a path computation element, or by a node in the network.

Given the topology in FIG. 1, the node applies the algorithm to explicit path 702 to generate segment list 704. Each of the segments in segment list 704 can be represented by adjacency segment identifiers in a segment stack, as shown in 706. In one embodiment, a node can insert segment stack 706 into a packet's header to cause the packet to be forwarded along the explicit path.

Figure 8:
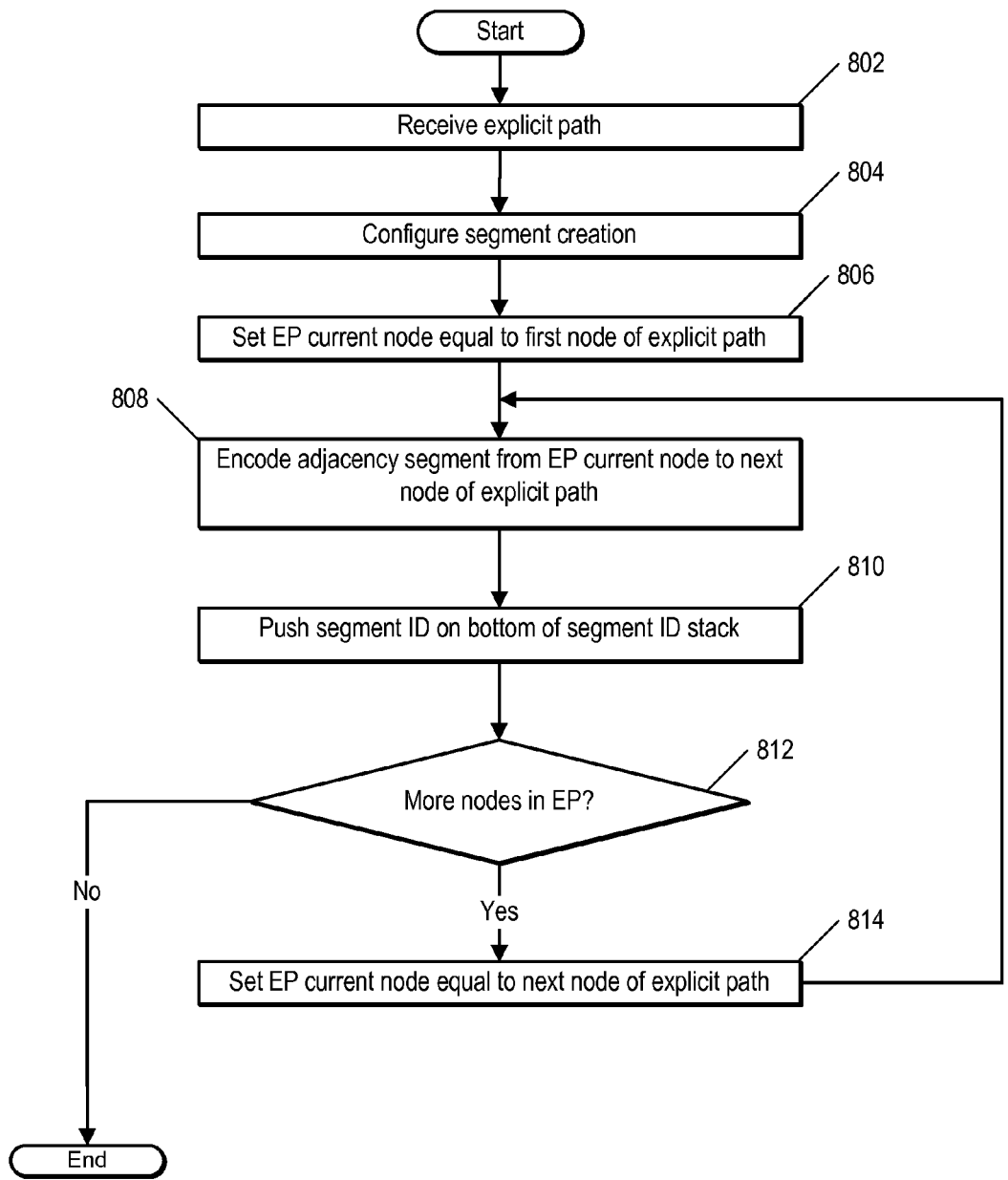
FIG. 8 is a flow chart illustrating an example process employed by a node of FIG. 1.

FIG. 8 shows an example method performed by an algorithm to encode an explicit path into a list of segments using adjacency segments only. Packets that are forwarded along the list of segments traverse the nodes in the explicit path. The algorithm can be performed by a node, such as shown in FIG. 1, or any other path computation element. The algorithm generates a list of segments that encodes an explicit path through the topology, as shown in FIG. 1.

The method begins at 802 with receipt of an explicit path. The explicit path can be received as information identifying a list of nodes and/or segments between a source and a destination. At 804, the algorithm used to encode to the explicit path is configured. In one embodiment, configuring the algorithm involves specifying that only adjacency segments should be used to encode the explicit path.

At 806, the algorithm sets a variable, for example, a variable entitled "EP current node," equal to the identifier of the first node of the explicit path equal. In the example of FIG. 7, the value or EP current path is set to Node A. At 808, the node encodes an adjacency segment from EP current node to the next node of the explicit path. In the example of FIG. 7, the algorithm specifies an adjacency segment from Node A to Node B. At 810, the algorithm pushes an adjacency segment ID corresponding to the adjacency segment onto the bottom of a segment stack, such as segment stack 706 of FIG. 7. In one embodiment, the algorithm determines the adjacency segment ID based on routing information advertised by the first node in the adjacency segment and stored by the node that implements the algorithm.

At 812, the algorithm determines whether there are additional nodes in the explicit path. If not, the method ends. Otherwise, the algorithm sets the value of EP current node equal to the next node in the explicit path, at 814. The method then loops to 808 and repeats while additional nodes remain in the explicit path.

Multiple Paths Implementation

Figure 9:
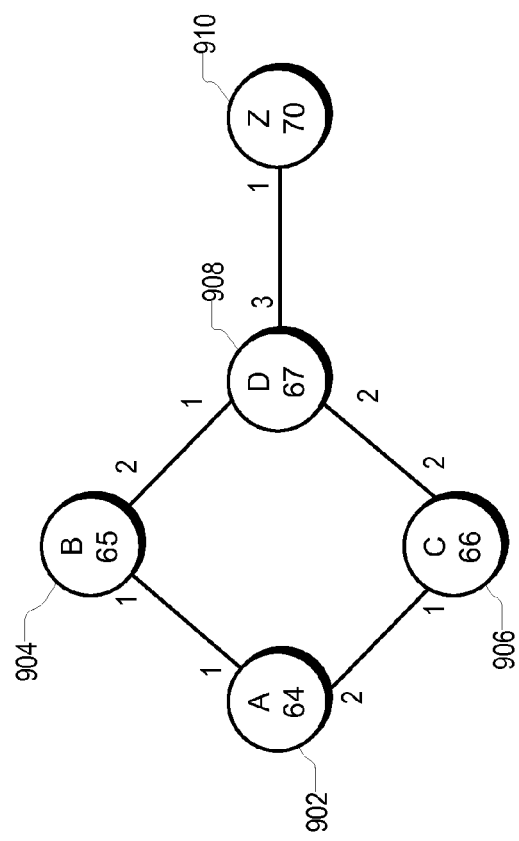
FIG. 9 is a block diagram illustrating an example network.

FIG. 9 shows an example of a portion of a segment routing (SR) enabled network 900. Network 900 consists of nodes 902-910. Nodes 902-910 can be implemented as SR nodes, which are nodes that are configured to employ SR. Nodes 902-910 are assigned unique nodal segment IDs 64-70, respectively. In some embodiments, a user, such as a network administrator, detects a node coming online or joining a network and assigns the node a nodal segment ID. In response to being assigned a nodal segment ID, the node advertises the nodal segment ID to other nodes in the network.

Each of the nodes 902-910 have interfaces that are identified as shown. For example, node 67 has three interfaces designated 1-3, respectively. Each of the nodes 902-910 is assigned a node prefix that is unique within network 900. Nodes 902-910 can also assign locally significant adjacency segment IDs and/or service segment IDs. Node 67 can assign, for example, service segment ID 5001 for a deep packet inspection service provided by the node.

Figure 10:
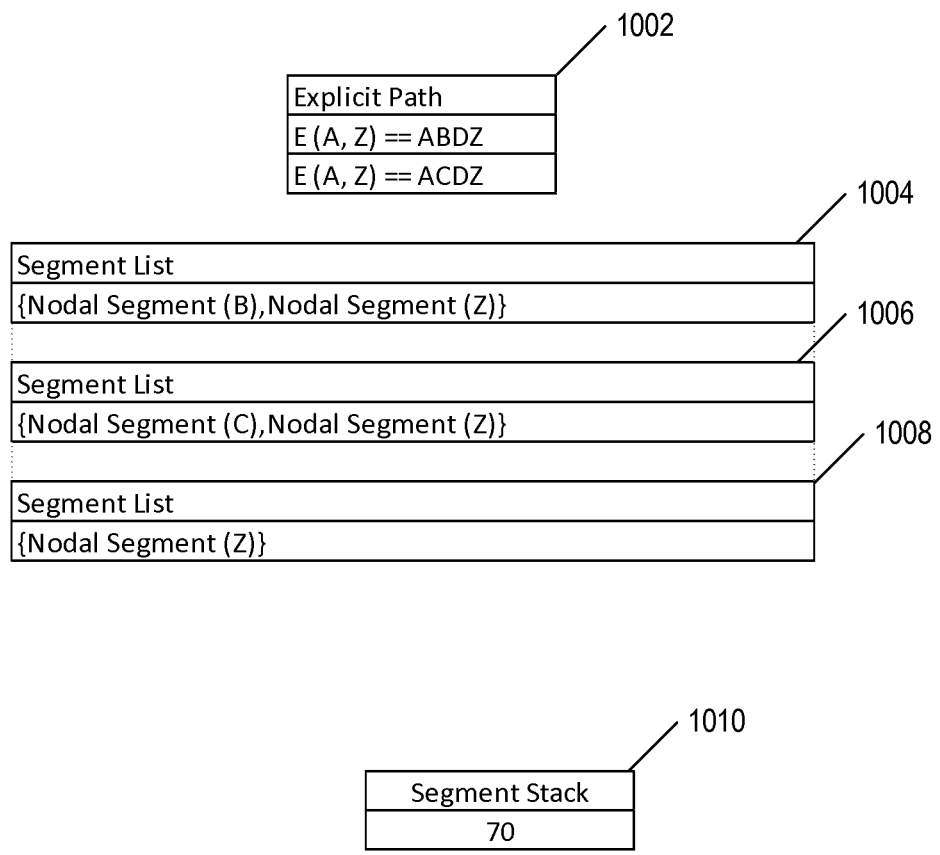
FIG. 10 is a graphical representation of an example explicit path, example segment list, and example segment stack.

FIG. 10 shows an example of where multiple explicit paths 1002 are given. In one embodiment, either of the explicit paths may be acceptable. Multiple paths may be specified to load share network traffic. An algorithm, as discussed above, for encoding each explicit path into a respective list of segments is applied for each explicit path. The algorithm produces segment lists 1004 and 1006, which encode the explicit paths, given the topology illustrated in FIG. 9. For the purpose of this disclosure, it will be assumed, unless otherwise noted, that the links in FIG. 9 all have the same cost.

In one embodiment, segment lists 1004 and 1006 can be compressed into a single segment list 1008, using the inherent ECMP property of nodal segments. Compressing the segment list into fewer segments results in a smaller segment stack to add to packets and transmit. FIG. 10 also shows a segment stack 1010 that can be added to a packet's header to direct the packet along the explicit paths.

Figure 11:
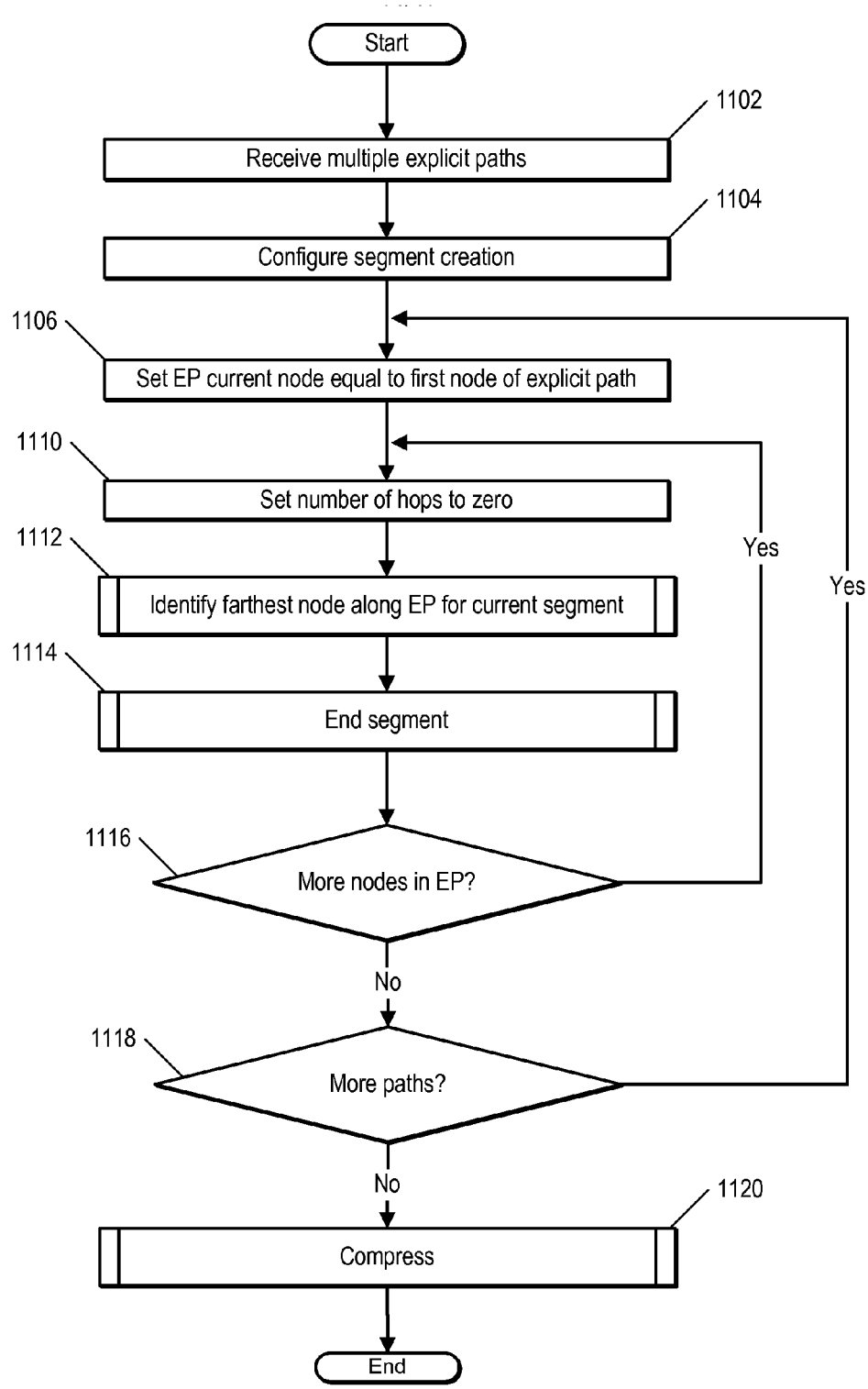
FIG. 11 is a flow chart illustrating an example process employed by a node of FIG. 9.

FIG. 11 is a flowchart illustrating an embodiment in which multiple explicit paths are given. When multiple explicit paths are given, a node performs an algorithm to generate, for each explicit path, a list of segments that encodes the explicit path.

The method begins at 1102, in response to the node receiving multiple explicit paths, such as explicit paths 1002 of FIG. 10. The explicit paths can be received as information identifying lists of nodes and/or segments between one or more source nodes and destination nodes. As shown in FIG. 11, the algorithm has certain similarities to the algorithms described above. Steps 1104 through 1116 correspond to steps 304 through 316 in FIG. 3. Description of repeated elements is omitted here for the sake of brevity.

At 1118, the algorithm determines whether all of the given explicit paths have been processed or not. That is, the algorithm determines whether all given explicit paths have been encoded as segment lists. If not, the method repeats until a segment list has been generated for each given explicit path. Once all explicit paths have been encoded as segment lists, a compression step is performed at 1120, as described in more detail with regard to FIG. 12.

Figure 12:
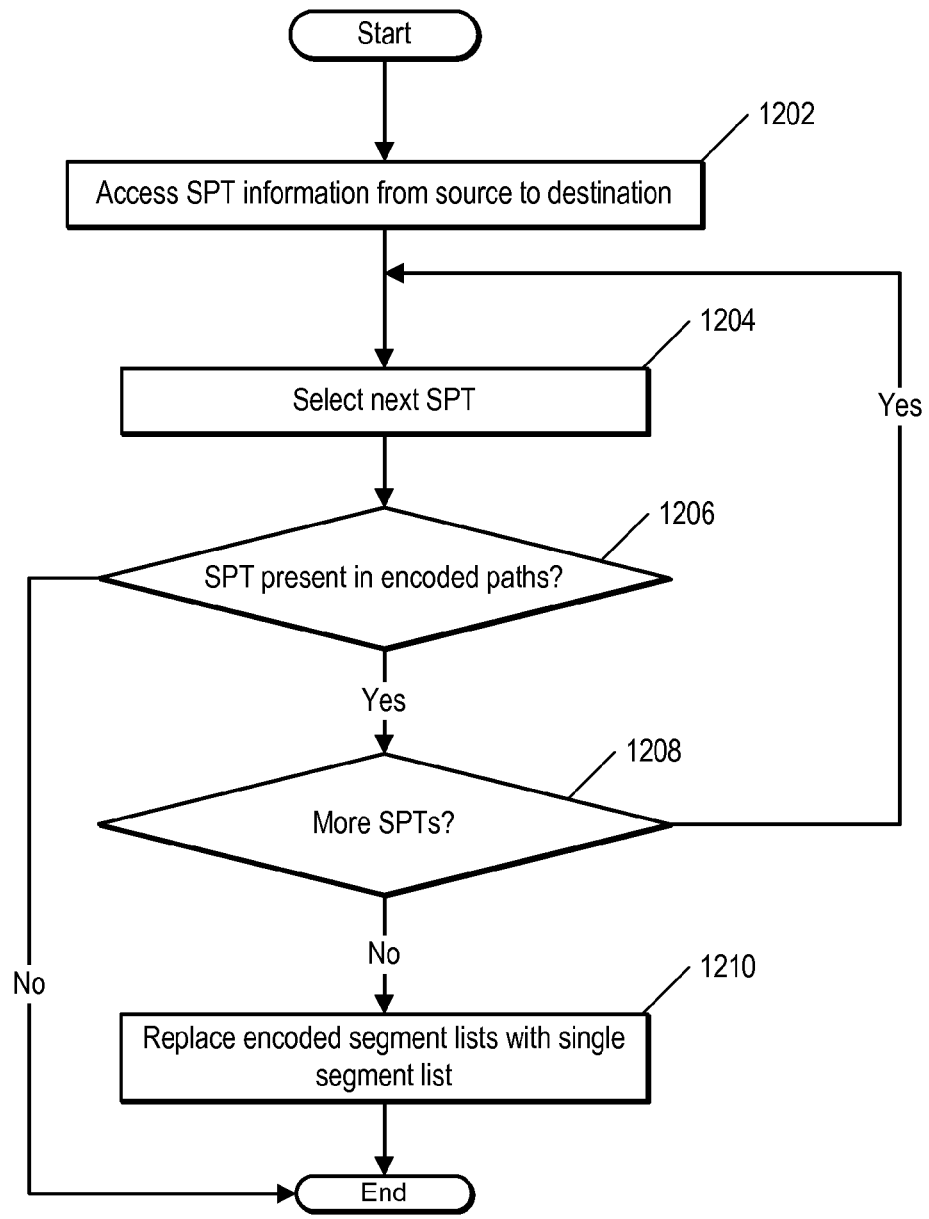
FIG. 12 is a flow chart illustrating an example process employed by a node of FIG. 9.

FIG. 12 illustrates a flowchart showing steps of an algorithm performed by a node encoding multiple explicit paths. In one embodiment, the steps in FIG. 12 are performed to compress multiple segment lists into a single segment list. At 1202, the algorithm accesses shortest path information from the given source to the destination. It is assumed, for the purposes of this example, that each of the multiple explicit paths starts at the same source and ends at the same destination, though this need not be the case and segment lists encoding paths from different sources and destinations can be compressed according to the algorithm illustrated herein. In one embodiment, the shortest path information has already been calculated, for example, when the algorithm was encoding a segment list for each explicit path. In another embodiment, the node implementing the algorithm calculates the shortest path information from the source to the destination at 1202.

At 1204, an iterative process begins with the algorithm selecting the next shortest path. The first time the algorithm traverses the illustrated flow, the next shortest path will be the first shortest path included in the calculated shortest path information. In one embodiment, there will be multiple equal costs multi-paths from the source to the destination. Once the first shortest path has been selected, at 1206, the algorithm determines whether the shortest path is present in the encoded paths. That is, the algorithm determines whether the selected shortest path is identical to any of the explicit paths given. If all the calculated shortest paths are included in the set of given explicit paths, the compression step can use a single segment list to represent all of the encoded paths. However, if a shortest path exists from the source to the destination which is not specified as a given explicit path, the compression cannot be performed. For example, if a nodal segment from the source to the destination is used to represent the given explicit paths, and one of the calculated shortest paths is not specified as a given explicit path, there is no way to guarantee that traffic will not travel the shortest path which was not specified as a given explicit path. Therefore, no compression is allowed, since the compression would introduce the risk that traffic would be routed along a path other than the given explicit paths.

At 1208, if the selected shortest path is present in the given explicit paths, or the segment list representing the given explicit paths, the method returns to 1204 and the next shortest path from the source to the destination is selected. Once all of the calculated shortest paths from the source to the destination have been examined and compared against the given explicit paths, if all the calculated shortest paths were present in the given explicit paths, the node replaces the encoded segment lists with a single segment list, at 1210.

Limited SPT Calculation Implementation

In some embodiments, it may be desirable to limit the amount of resources used for shortest path computations performed in executing an algorithm to encode an explicit path as a list of segments. As discussed with regard to FIGS. 13-16, the number of shortest path computations can be limited to two. This can be advantageous, for example, when computing power of a node employing the algorithm is limited.

To limit the number of shortest path computations to two, the algorithm computes the farthest node that can be unambiguously reached along the explicit path from the source towards the destination and generates a nodal segment from the source to the node. The algorithm then computes a reverse-shortest path from the destination and determines the farthest node along the explicit path towards the source that can unambiguously reach the destination. The algorithm generates a nodal segment from this node to the destination. The algorithm then joins the last node of the first nodal segment with the first node of the second nodal segment using a series of adjacency segments. Thus, the explicit path is traversed with only two shortest path computations.

Figure 13:
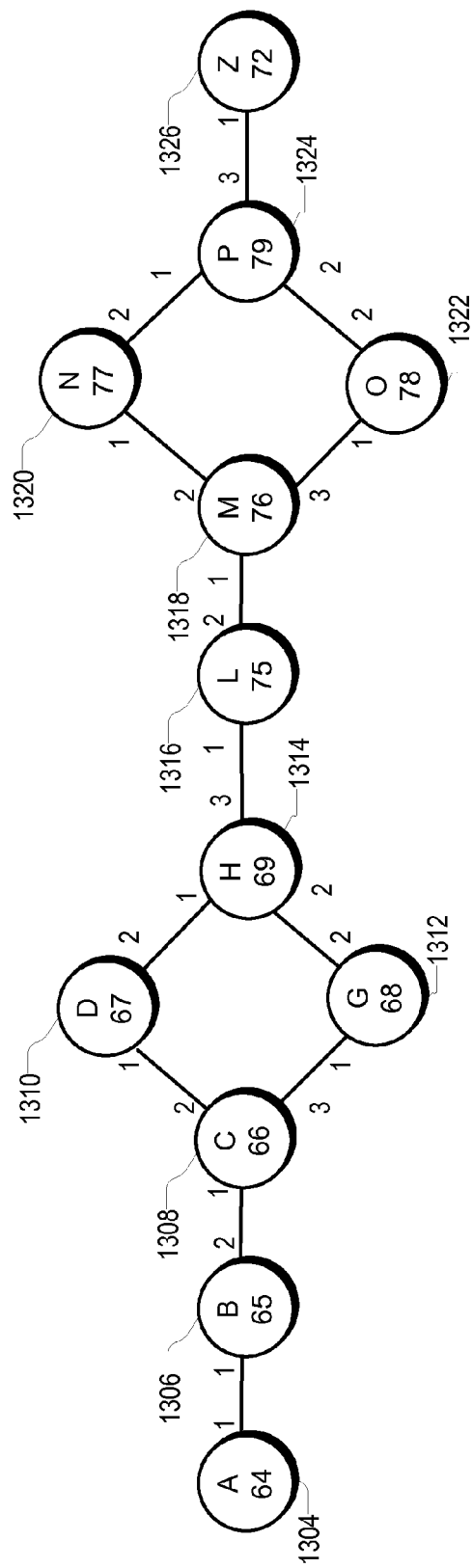
FIG. 13 is a block diagram illustrating an example network.

FIG. 13 shows an example of a portion of a segment routing (SR) enabled network 1300. Network 1300 consists of nodes 1304-1326. Nodes 1304-1326 can be implemented as SR nodes, which are nodes that are configured to employ SR. Nodes 1304-1326 are assigned unique nodal segment IDs 64-79, respectively. In some embodiments, a user, such as a network administrator, detects a node coming online or joining a network and assigns the node a nodal segment ID. In response to being assigned a nodal segment ID, the node advertises the nodal segment ID to other nodes in the network.

Each of the nodes 1304-1326 has interfaces that are identified as shown. For example, node 66 has three interfaces designated 1-3, respectively. Each of the nodes 1304-1326 is assigned a node prefix that is unique within network 1300. Nodes 1304-1326 can also assign locally significant adjacency segment IDs and/or service segment IDs. Node 66 can assign, for example, service segment ID 5001 for a deep packet inspection service provided by the node.

Figure 14:
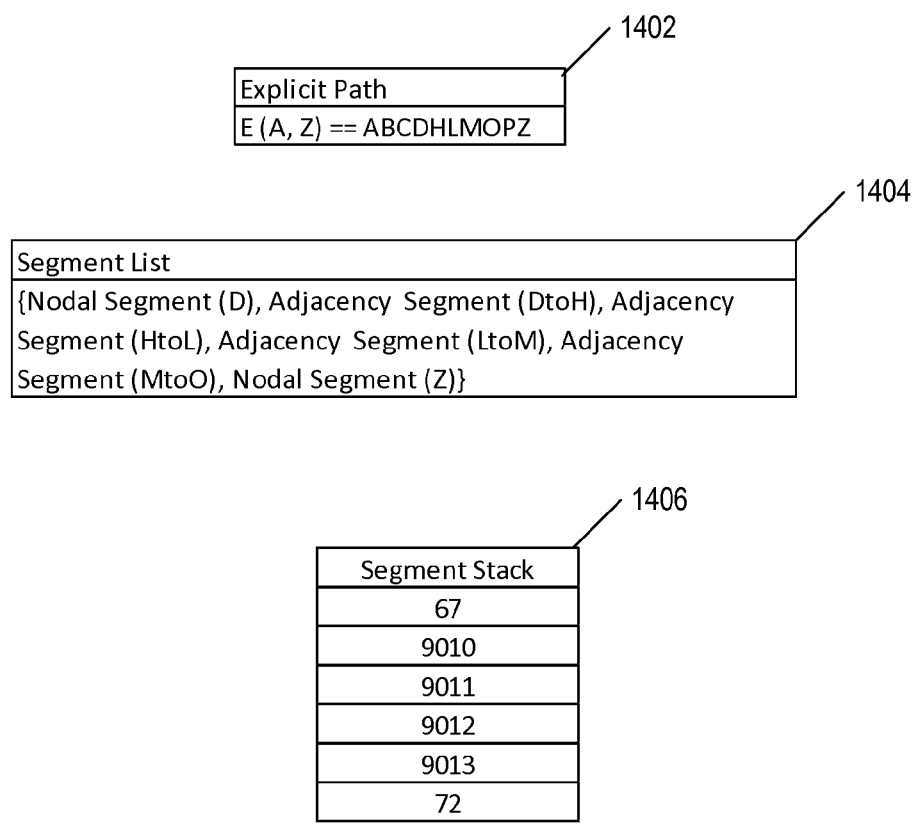
FIG. 14 is a graphical representation of an example explicit path, example segment list, and example segment stack.

FIG. 14 shows an example of an explicit path 1402 and a list of segments 1404 that encodes explicit path 1402, given the topology illustrated in FIG. 13. For the purpose of this disclosure, it will be assumed, unless otherwise noted, that the links in FIG. 13 all have the same cost. FIG. 14 also shows segment stack 1406, which can be added to a packet's header to direct the packet along the explicit path. The segment list and segment stack can be calculated using a recursive algorithm applied, for example, by a path computation element, or by a node in the network.

In the example of FIG. 14, explicit path 1402 is encoded as the list of segments shown in 1404. Segment list 1404 can be converted to segment stack 1406 using the segment IDs from the nodes in FIG. 13 as well as adjacency segment IDs advertised by the nodes. Thus, given explicit path 1402 and the topology of FIG. 13, the algorithm generates segment stack 1406. In one embodiment, a node can insert segment stack 1046 into a packet's header to cause the packet to be forwarded along the explicit path.

Figure 15:
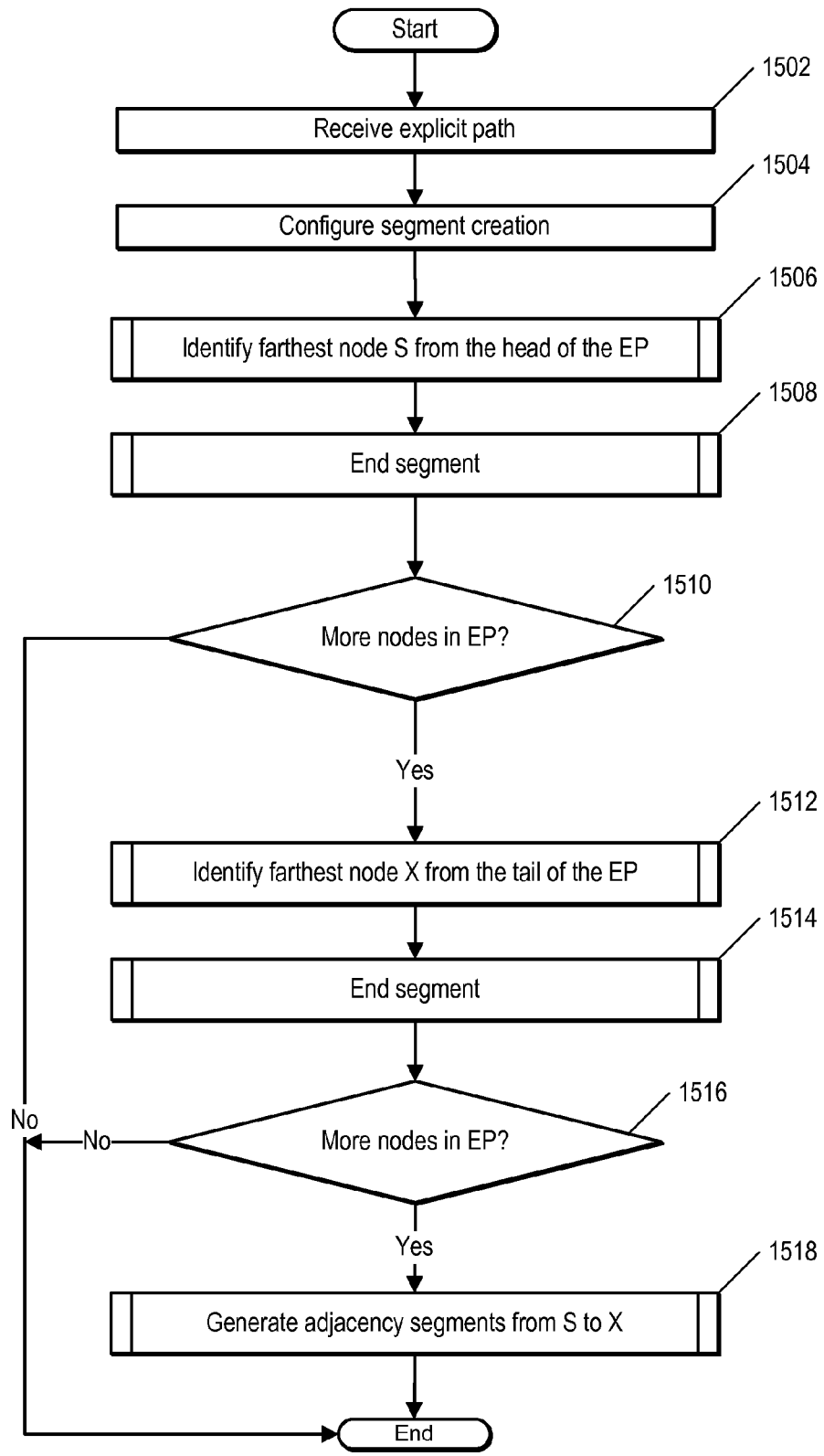
FIG. 15 is a flow chart illustrating an example process employed by a node of FIG. 13.

FIG. 15 shows an example of a method used to implement an algorithm to encode an explicit path as a list of segments. In one embodiment, the algorithm utilizes only two shortest path computations. At 1502, the algorithm receives an explicit path as an input. In one example, the explicit path is explicit path 1402 as shown in FIG. 14.

At 1504, the algorithm configures segment creation. The algorithm can perform this operation in response to receiving the configuration information from a user, where the information specifies the user's preference for types of segments to be used to encode the explicit path. In the example of FIG. 15, calculation of shortest paths is limited to two. For each shortest path calculation, a nodal segment maybe generated. The at most two nodal segments will be joined by adjacency segments.

At 1506, the algorithm identifies the farthest node, node S, from the head of the explicit path. At 1508, the algorithm ends or terminates the segment at node S. 1506 and 1508 are similar to elements described with regard to FIG. 3, specifically, elements 312 and 314. A full description is omitted here for the sake of brevity. In the example topology of FIG. 13, the farthest node that can be unambiguously reached from source Node A along explicit path 1402 from FIG. 14 is Node D. Node H cannot be unambiguously reached from Node A because traffic may be routed to Node H via the equal cost path that travels through Node G.

At 1510, the algorithm determines whether more nodes are present in the explicit path. If not, the method ends. If additional nodes do exist in the explicit path, the algorithm identifies a farthest node X from the tail of the explicit path, at 1512. In one embodiment, this involves computing a reverse shortest path tree from the tail of the explicit path. Using the example topology of FIG. 13, the tail end of the explicit path is Node Z, which is the destination node of the given explicit path. Therefore, at 1512, the algorithm computes the farthest node X towards the source node of the given explicit path which can unambiguously reach Node Z. This operation is similar to elements described with regard to FIG. 3, specifically, elements 312 and a full description is omitted for the sake of brevity. In this example, Node O is the farthest node from Node Z along the explicit path that can unambiguously reach Node Z along the explicit path. Node M (the next node along the explicit path) cannot unambiguously reach Node Z because traffic could be routed along the equal cost path through Node N.

At 1514, the algorithm generates a nodal segment from node X to Node Z. 1514 is similar to operations discussed with regard to FIG. 3, specifically 314. A detailed description of 1514 is omitted for the sake of brevity. At 1516, the algorithm determines whether more nodes exist in the explicit path. If there are additional nodes in the explicit path, the algorithm generates adjacency segments connecting node S to node X at 1518, as discussed in greater detail with regard to FIG. 16. In this example, the algorithm connects Node D to Node O with adjacency segments.

Figure 16:
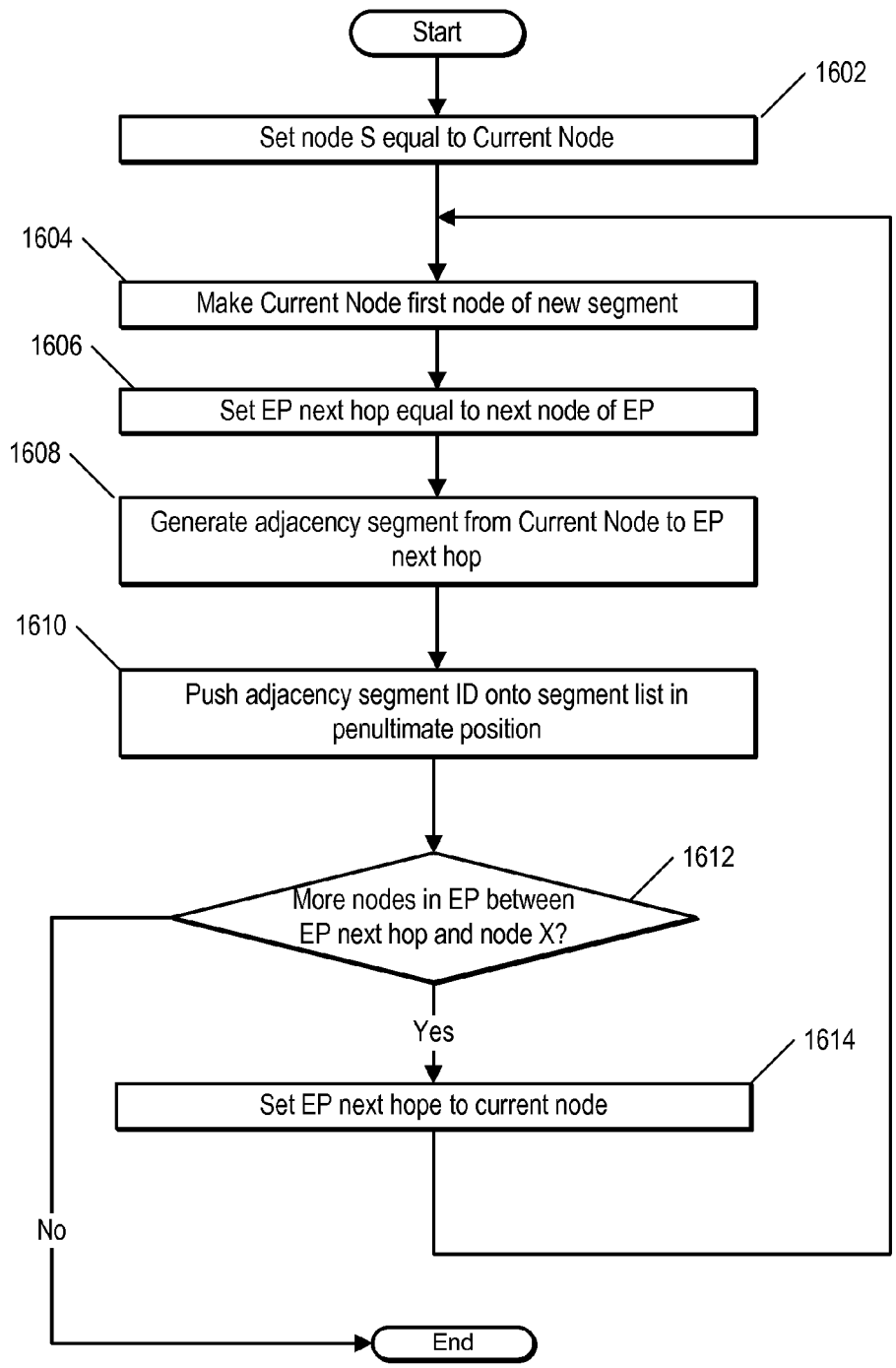
FIG. 16 is a flow chart illustrating an example process employed by a node of FIG. 13.

FIG. 16 shows additional details of an algorithm of encoding an explicit path as a list of segments. Specifically, FIG. 16 shows connecting two nodal segments with one or more adjacency segments. At 1602, the algorithm sets node S equal to a variable entitled "Current Node." At 1604, the algorithm makes Current Node the first node of an adjacency segment. Next, the algorithm sets a variable called "EP next hop" equal to the next node of the explicit path, at 1606. At 1608, the algorithm generates an adjacency segment from Current Node to EP next hop. The algorithm pushes the adjacency segment ID associated with the newly created adjacency segment onto a segment list, such as segment list 1404 of FIG. 14, in the penultimate position of the segment list, at 1610. The segment ID in the last position of the segment list is that of the nodal segment to the destination node of the explicit path, as calculated at 1512 of FIG. 15.

At 1612, the algorithm determines whether the explicit path includes more nodes between EP next hop and the node X. If not, the method ends. If there are additional nodes in the explicit path between EP next hop and node X, at 1614 the algorithm sets EP next hop equal to Current Node and the algorithm returns to 1604.

Example Node

Figure 17:
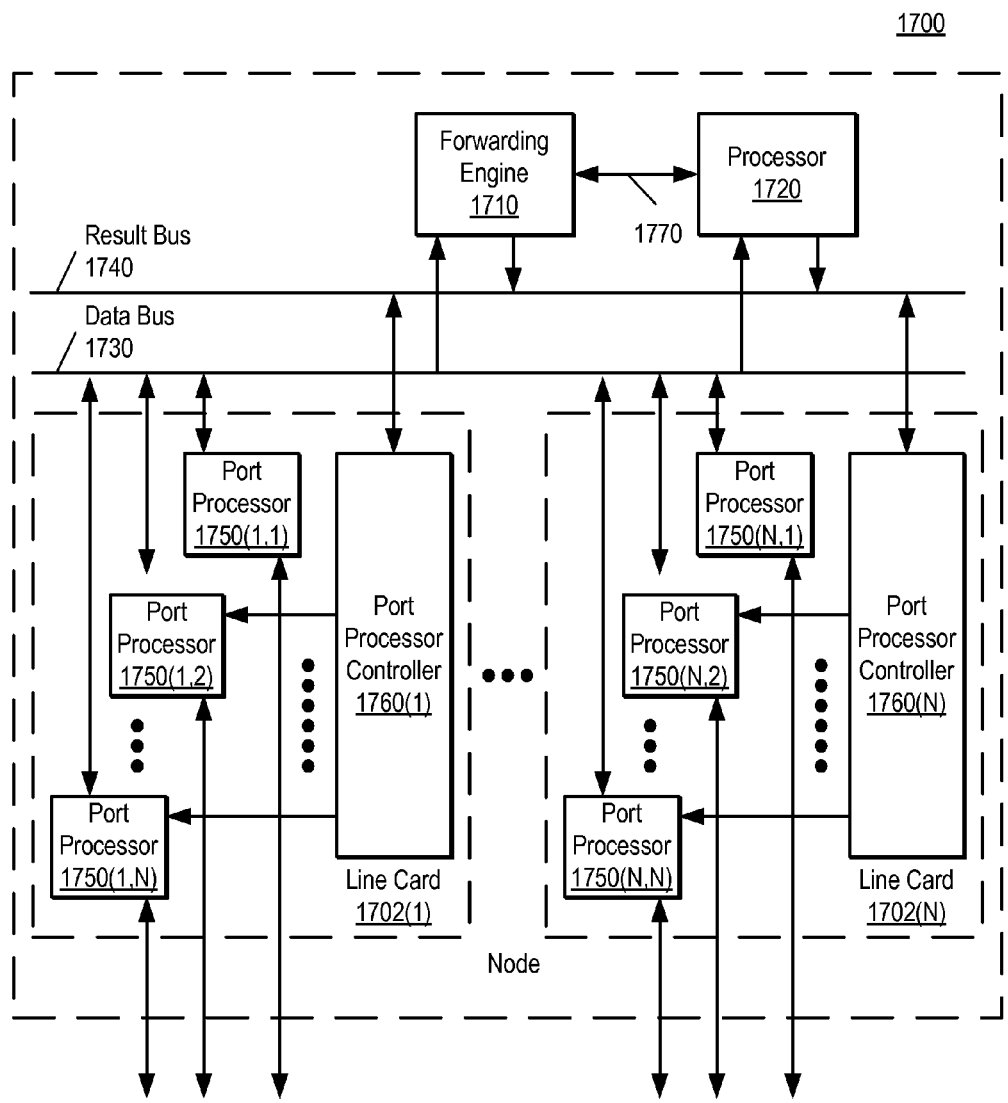
FIG. 17 is a block diagram illustrating certain components of an example node that can be employed in the network of FIG. 1, 9, or 13.

FIG. 17 is a block diagram illustrating certain additional and/or alternative components of nodes that can be employed in the networks shown in FIGS. 1, 9, and 13. In this depiction, node 1700 includes a number of line cards (line cards 1702(1)-(N)) that are communicatively coupled to a forwarding engine or packet forwarder 1710 and a processor 1720 via a data bus 1730 and a result bus 1740. Line cards 1702(1)-(N) include a number of port processors 1750(1,1)-(N,N) which are controlled by port processor controllers 1760(1)-(N). It will also be noted that forwarding engine 1710 and processor 1720 are not only coupled to one another via data bus 1730 and result bus 1740, but are also communicatively coupled to one another by a communications link 1770.

The processors 1750 and 1760 of each line card 1702 may be mounted on a single printed circuit board. When a packet or packet and header are received, the packet or packet and header may be identified and analyzed by router 1700 in the following manner. Upon receipt, a packet (or some or all of its control information) or packet and header is sent from the one of port processors 1750(1,1)-(N,N) at which the packet or packet and header was received to one or more of those devices coupled to data bus 1730 (e.g., others of port processors 1750(1,1)-(N,N), forwarding engine 1710 and/or processor 1720). Handling of the packet or packet and header can be determined, for example, by forwarding engine 1710. For example, forwarding engine 1710 may determine that the packet or packet and header should be forwarded to one or more of port processors 1750(1,1)-(N, N). This can be accomplished by indicating to corresponding one(s) of port processor controllers 1760(1)-(N) that the copy of the packet or packet and header held in the given one(s) of port processors 1750(1,1)-(N,N) should be forwarded to the appropriate one of port processors 1750(1,1)-(N,N). In addition, or alternatively, once a packet or packet and header has been identified for processing, forwarding engine 1710, processor 1720 or the like can be used to process the packet or packet and header in some manner or add packet security information, in order to secure the packet. On a node sourcing such a packet or packet and header, this processing can include, for example, encryption of some or all of the packet's or packet and header's information, the addition of a digital signature or some other information or processing capable of securing the packet or packet and header. On a node receiving such a processed packet or packet and header, the corresponding process is performed to recover or validate the packet's or packet and header's information that has been thusly protected.

Node 1700 may also employ any number of software, firmware, and/or hardware configurations. For example, one or more of the embodiments disclosed herein may be encoded as a computer program (also referred to as computer software, software applications, computer-readable instructions, or computer control logic) on a computer-readable storage medium. Examples of computer-readable storage media include magnetic-storage media (e.g., hard disk drives and floppy disks), optical-storage media (e.g., CD- or DVD-ROMs), electronic-storage media (e.g., solid-state drives and flash media), and the like. Such computer programs can also be transferred to node 1700 for storage in memory via a network such as the Internet or upon a carrier medium.

The computer-readable medium containing the computer program may be loaded into node 1700. All or a portion of the computer program stored on the computer-readable medium may then be stored in system memory and/or various portions of storage devices coupled to node 1700 (not shown). When executed by processor 1720, a computer program loaded into node 1700 may cause processor 1720 to perform and/or be a means for performing the functions of one or more of the embodiments described and/or illustrated herein. Additionally or alternatively, one or more of the embodiments described and/or illustrated herein may be implemented in firmware and/or hardware.

Although the present invention has been described in connection with several embodiments, the invention is not intended to be limited to the specific forms set forth herein. On the contrary, it is intended to cover such alternatives, modifications, and equivalents as can be reasonably included within the scope of the invention as defined by the appended claims.

What is claimed is:

1. A method comprising:
receiving information that identifies an explicit path from a first segment routing enabled node to a second segment routing enabled node in a segment routing enabled communications network, wherein
the information comprises an identification of a sequence of nodes or links defining the explicit path for a packet to traverse through the segment routing enabled communications network;
generating a set of segment identifiers, wherein
the set of segment identifiers encodes the explicit path,
each segment identifier within the set of segment identifiers is included in one or more respective segment routing forwarding tables stored at each segment routing enabled node along the explicit path, and
generating the set of segment identifiers comprises selecting a segment identifier type from among
a nodal segment identifier type in which a nodal segment identifier is assigned uniquely to a single node within the network, or
an adjacency segment identifier type in which an adjacency segment identifier is assigned to a link between two contiguous nodes; and
storing the set of segment identifiers at the first segment routing enabled node, wherein
first segment routing enabled node is configured to add the set of segment identifiers to a header of the packet.

2. The method of claim 1, wherein
a first segment identifier of the set of segment identifiers identifies a nodal segment, and
the nodal segment comprises a shortest path to a node associated with the nodal segment.

3. The method of claim 2, wherein
a second segment identifier of the set of segment identifiers identifies an adjacency segment.

4. The method of claim 1, further comprising:
computing a shortest path from the first node to the second node; and
comparing an explicit path node identifier with a shortest path node identifier.

5. The method of claim 2, further comprising:
determining, for a node along the explicit path, whether the shortest path represented by a nodal segment associated with the node diverges from the explicit path.

6. The method of claim 1, further comprising:
calculating a number of hops that represents an overlap between the explicit path and a shortest path from the first node to the second node.

7. The method of claim 1, wherein
the information further identifies a second explicit path, and
the generating comprises
generating a second set of segment identifiers, and
combining at least a portion of the set of segment identifiers and at least a portion of the second set of segment identifiers to form a combined set of segment identifiers.

8. The method of claim 1, wherein
the generating comprises calculating a reverse shortest path from the second node towards the first node.

9. A system comprising:
a first segment routing enabled node configured to
receive information that identifies an explicit path from the first segment routing enabled node to a second segment routing enabled node in a segment routing enabled communications network, wherein
the information comprises an identification of a sequence of nodes or links defining the explicit path for a packet to traverse through the segment routing enabled communications network;
generate a set of segment identifiers, wherein
the set of segment identifiers encodes the explicit path,
each segment identifier within the set of segment identifiers is included in one or more respective segment routing forwarding tables stored at each segment routing enabled node along the explicit path, and
generating the set of segment identifiers comprises selecting a segment identifier type from among
a nodal segment identifier type in which a nodal segment identifier is assigned uniquely to a single node within the network, or
an adjacency segment identifier type in which an adjacency segment identifier is assigned to a link between two contiguous nodes; and
add the set of segment identifiers to a header of the packet.

10. The system of claim 9, wherein
a first segment identifier of the set of segment identifiers identifies a nodal segment, and
the nodal segment comprises a shortest path to a node associated with the nodal segment.

11. The system of claim 10, wherein
a second segment identifier of the set of segment identifiers identifies an adjacency segment.

12. The system of claim 9, wherein the first node is further configured to:
compute a shortest path from the first node to the second node; and
compare an explicit path node identifier with a shortest path node identifier.

13. The system of claim 10, wherein the first node is further configured to:
determine, for a node along the explicit path, whether the shortest path represented by a nodal segment associated with the node diverges from the explicit path.

14. The system of claim 9, wherein the first node is further configured to:
calculate a number of hops that represents an overlap between the explicit path and a shortest path from the first node to the second node.

15. The system of claim 9, wherein
generating the set of segment identifiers comprises calculating a reverse shortest path from the second node towards the first node.

16. An apparatus comprising:
a means for receiving information that identifies an explicit path from a first segment routing enabled node to a second segment routing enabled node in a segment routing enabled communications network, wherein
the information comprises an identification of a sequence of nodes or links defining the explicit path for a packet to traverse through the segment routing enabled communications network;
a means for generating a set of segment identifiers, wherein
the set of segment identifiers encodes the explicit path,
each segment identifier within the set of segment identifiers is included in one or more respective segment routing forwarding tables stored at each segment routing enabled node along the explicit path, and
generating the set of segment identifiers comprises selecting a segment identifier type from among
a nodal segment identifier type in which a nodal segment identifier is assigned uniquely to a single node within the network, or
an adjacency segment identifier type in which an adjacency segment identifier is assigned to a link between two contiguous nodes; and
a means for storing the set of segment identifiers at the first segment routing enabled node, wherein
the first segment routing enabled node is configured to add the set of segment identifiers to a header of the packet.

17. The method of claim 5, further comprising:
selecting, as one of the segment identifiers within the set of segment identifiers, a nodal segment identifier identifying a nodal segment encoding the longest path unambiguously following the explicit path.

18. The method of claim 17, wherein the selecting comprises selecting the nodal segment identifier identifying the nodal segment encoding the longest path starting at the first segment routing enabled node, and further comprising:
selecting, as an additional one of the segment identifiers within the set of segment identifiers, a nodal segment identifier identifying a nodal segment encoding the longest path starting at the second segment routing enabled node and unambiguously following the explicit path.

* * * * *

UNITED STATES PATENT AND TRADEMARK OFFICE
CERTIFICATE OF CORRECTION

PATENT NO. : 9,979,601 B2
APPLICATION NO. : 14/211174
DATED : May 22, 2018
INVENTOR(S) : Filsfils et al.

It is certified that error appears in the above-identified patent and that said Letters Patent is hereby corrected as shown below:

Column 16
In Line 52, Claim 1, please insert --the-- before "first segment routing enabled node is configured"

Signed and Sealed this
Thirty-first Day of July, 2018

Andrei Iancu
*Director of the United States Patent and Trademark Office*